US010770878B1

(12) United States Patent
Nakashima et al.

(10) Patent No.: US 10,770,878 B1
(45) Date of Patent: Sep. 8, 2020

(54) ELECTRIC CONNECTION BOX

(71) Applicant: Yazaki Corporation, Tokyo (JP)

(72) Inventors: Akinori Nakashima, Shizuoka (JP); Kunihiko Takeuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/826,106

(22) Filed: Mar. 20, 2020

(30) Foreign Application Priority Data

Apr. 25, 2019 (JP) .................. 2019-083745

(51) Int. Cl.
*B60R 16/023* (2006.01)
*H02G 3/14* (2006.01)
*H02G 3/08* (2006.01)

(52) U.S. Cl.
CPC ........... *H02G 3/14* (2013.01); *B60R 16/0239* (2013.01); *H02G 3/083* (2013.01)

(58) Field of Classification Search
CPC .............................. B60R 16/0239; H02G 3/14
See application file for complete search history.

(56) References Cited

U.S. PATENT DOCUMENTS

| | | | | |
|---|---|---|---|---|
| 6,121,548 A * | 9/2000 | Matsuoka | ........... | B60R 16/0239 174/59 |
| 6,541,700 B2 * | 4/2003 | Chiriku | ............... | B60R 16/0238 174/50 |
| 6,822,163 B2 * | 11/2004 | Saneto | ................... | H02G 3/086 174/50 |
| 7,586,038 B2 * | 9/2009 | Kanamaru | ............. | H02G 3/083 174/489 |
| 7,619,896 B2 * | 11/2009 | Yamashita | ............. | H01R 9/226 165/80.3 |
| 8,633,383 B2 * | 1/2014 | Akahori | ............... | H01R 9/2458 174/50 |
| 8,941,009 B2 * | 1/2015 | Makino | ................... | B60R 16/02 174/50 |
| 9,203,221 B2 * | 12/2015 | Kamigaichi | ............. | H02G 3/08 |
| 9,496,693 B2 * | 11/2016 | Maebashi | ............. | H05K 5/0052 |
| 9,743,545 B2 * | 8/2017 | Nakashima | .......... | H05K 5/0247 |
| 10,027,100 B1 * | 7/2018 | Nakano | ............... | B60R 16/0239 |
| 10,131,297 B1 * | 11/2018 | Kakimi | ............... | B60R 16/0207 |
| 2012/0073851 A1 * | 3/2012 | Takeuchi | ............ | B60R 16/0239 174/50.51 |

FOREIGN PATENT DOCUMENTS

JP         2006-149069 A      6/2006

* cited by examiner

*Primary Examiner* — Hung V Ngo
(74) *Attorney, Agent, or Firm* — Kenealy Vaidya LLP

(57) ABSTRACT

An electric connection box includes a frame having a cylindrical outer wall, and a cover having a side wall fitted into one end in an axial direction of the outer wall. The outer wall has a plate-shaped protruded portion, and the protruded portion has a pair of side portions respectively placed at one end and the other end in a width direction. The side wall has a pair of edge portions and has a notch between the pair of edge portions. Each of the pair of edge portions has a first facing surface and a second facing surface. The first facing surface abuts on the pair of side portions in a thickness direction of the protruded portion, and the second facing surface faces the pair of side portions in the width direction and positions the cover with respect to the frame.

20 Claims, 18 Drawing Sheets

ELECTRIC CONNECTION BOX

CROSS-REFERENCE TO RELATED APPLICATION(S)

The present application claims priority to and incorporates by reference the entire contents of Japanese Patent Application No. 2019-083745 filed in Japan on Apr. 25, 2019.

BACKGROUND OF THE INVENTION

1. Field of the Invention

The present invention relates to an electric connection box.

2. Description of the Related Art

Conventionally, there is an electric connection box including a box body and a cover member. In Japanese Patent Application Laid-open No. 2006-149069, an electric connection box including a box body, a cover member attached to the box body, an electric wire fixing piece, and a guide portion provided in the electric wire fixing piece and the cover member is disclosed. The guide portion of Japanese Patent Application Laid-open No. 2006-149069 includes a guide protrusion portion, and a guide groove the guide protrusion portion enters.

There is still room for improvement in a point of improving efficiency of work of assembling a frame and a cover. For example, in a case of a configuration in which a guide protrusion portion is guided by a guide groove, there is a case where work of putting the guide protrusion portion into the guide groove takes time.

SUMMARY OF THE INVENTION

An object of the present invention is to provide an electric connection box capable of improving efficiency of work of assembling a frame and a cover.

In order to achieve the above mentioned object, an electric connection box according to one aspect of the present invention includes a frame having a cylindrical outer wall and having a housing space on an inner side of the outer wall; and a cover having a side wall fitted into a first end portion, which is one end in an axial direction of the outer wall, in the axial direction, wherein the first end portion of the outer wall has a plate-shaped protruded portion that is protruded in the axial direction, the protruded portion has a pair of side portions respectively placed at one end and another end in a width direction and extended in the axial direction, the side wall has a pair of edge portions in the axial direction, the edge portions respectively corresponding to the pair of side portions, and has a notch between the pair of edge portions, each of the pair of edge portions has a first facing surface and a second facing surface, the first facing surface abuts on the pair of side portions in a thickness direction of the protruded portion in a state in which the frame and the cover are not fitted, and the second facing surface faces the pair of side portions in the width direction and positions the cover with respect to the frame in a state in which the first facing surface abuts on the pair of side portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, an electric connection box according to an embodiment of the present invention will be described in detail with reference to the drawings. Note that this invention is not limited by this embodiment. Also, components in the following embodiment include what can be easily assumed by those skilled in the art or what is substantially the same.

EMBODIMENT

Figure 1:
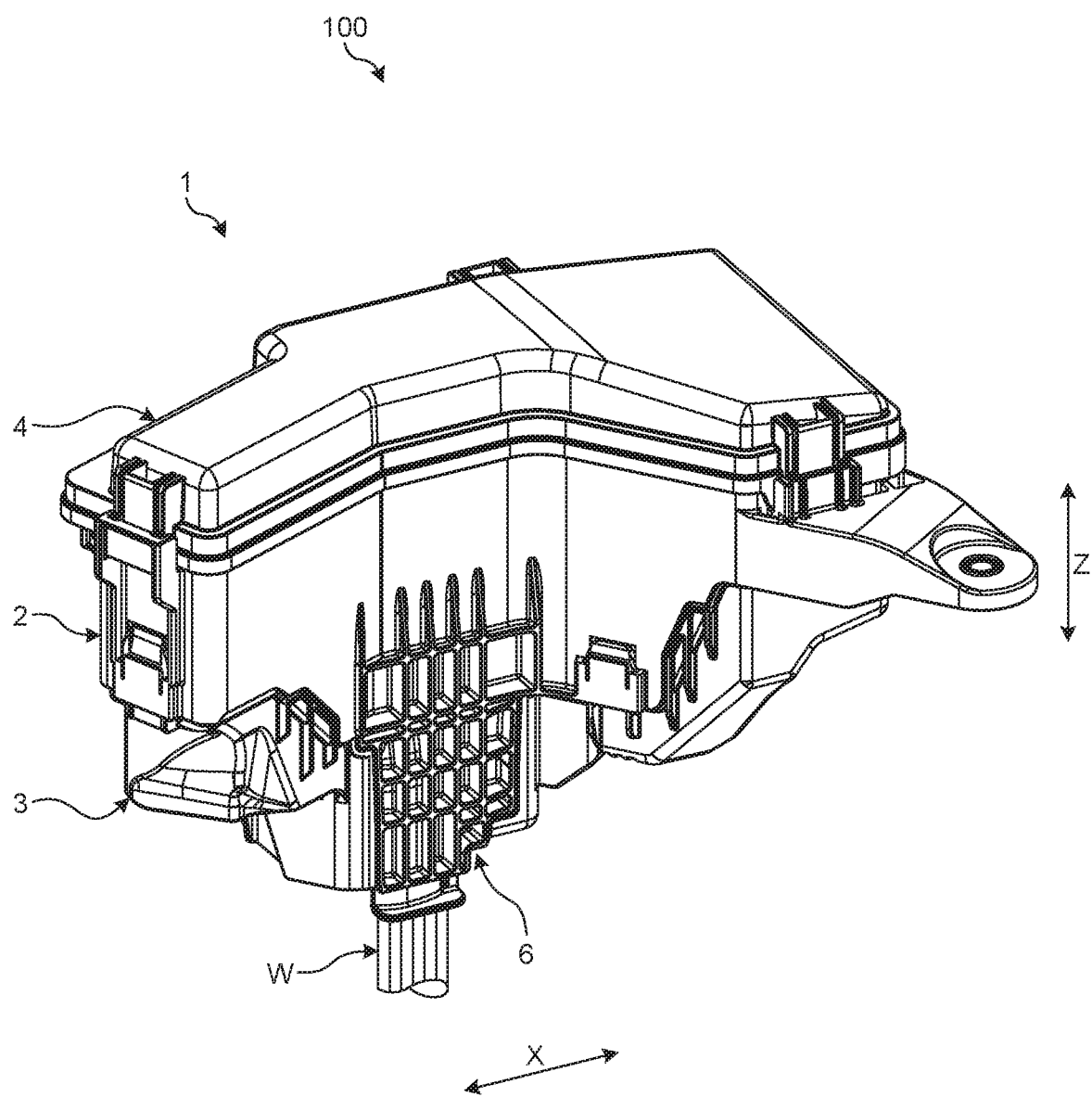
FIG. 1 is a perspective view of an electric connection box according to an embodiment.
Figure 2:
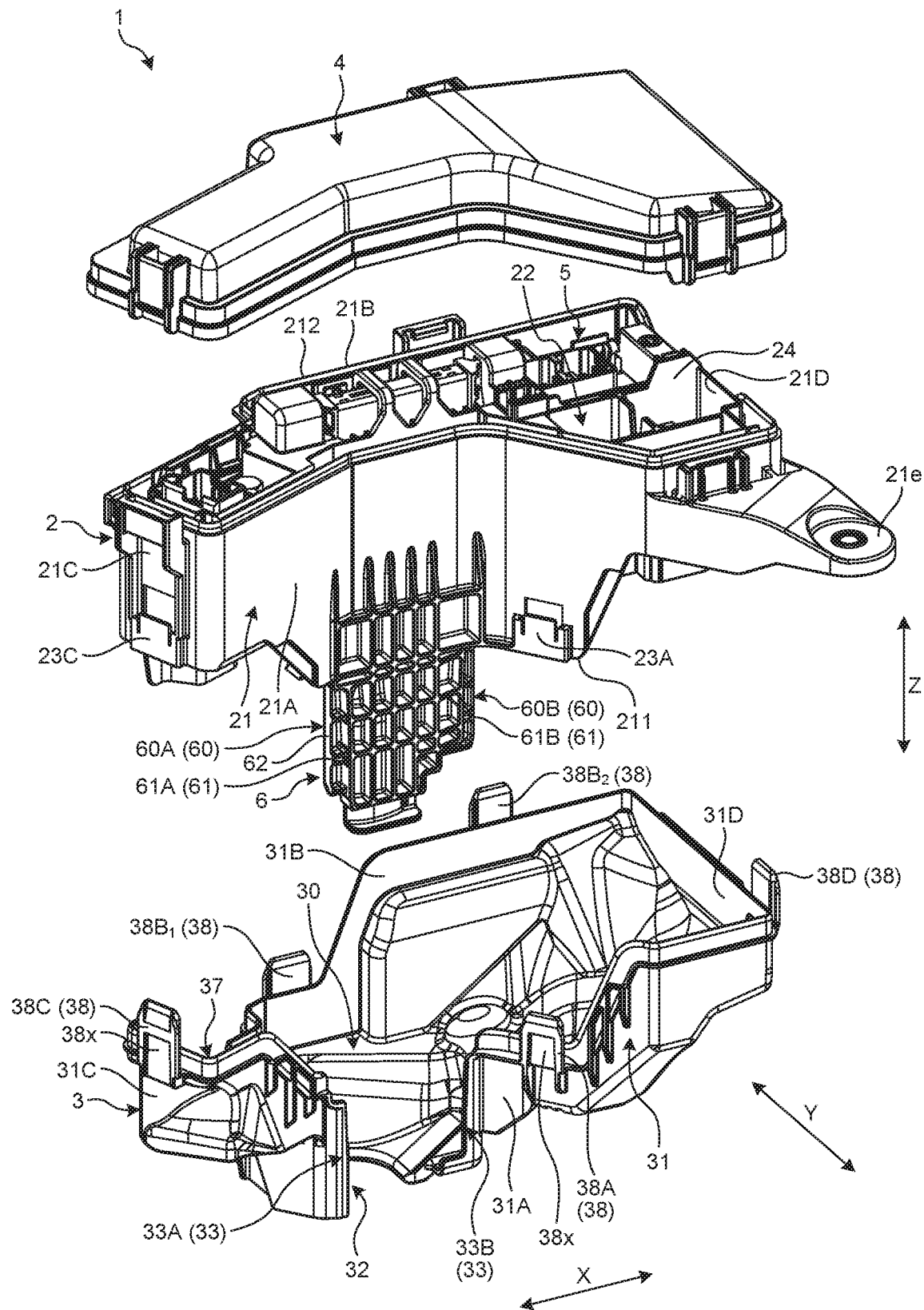
FIG. 2 is an exploded perspective view of the electric connection box according to the embodiment.
Figure 3:
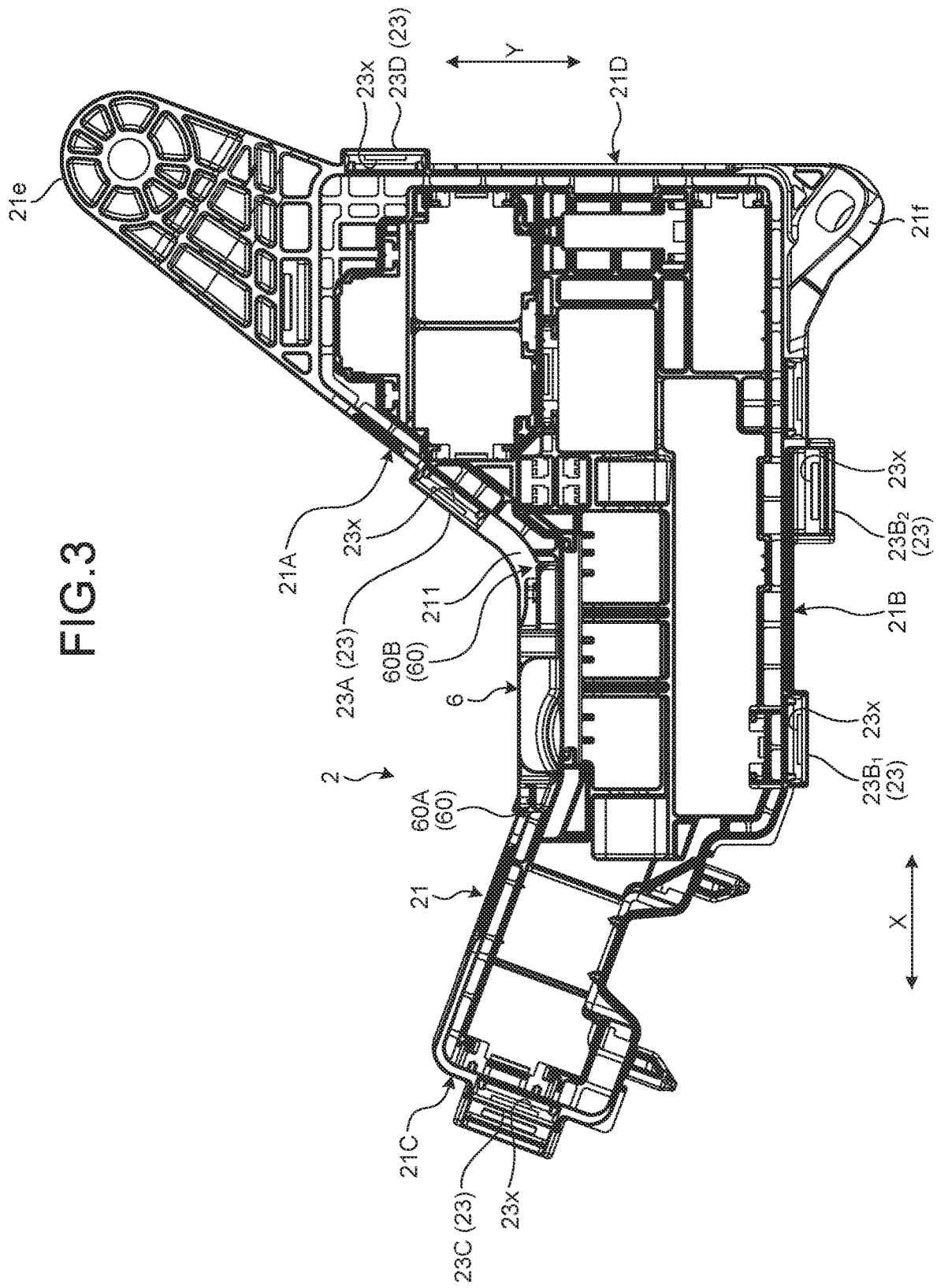
FIG. 3 is a bottom view of a frame according to the embodiment.
Figure 4:
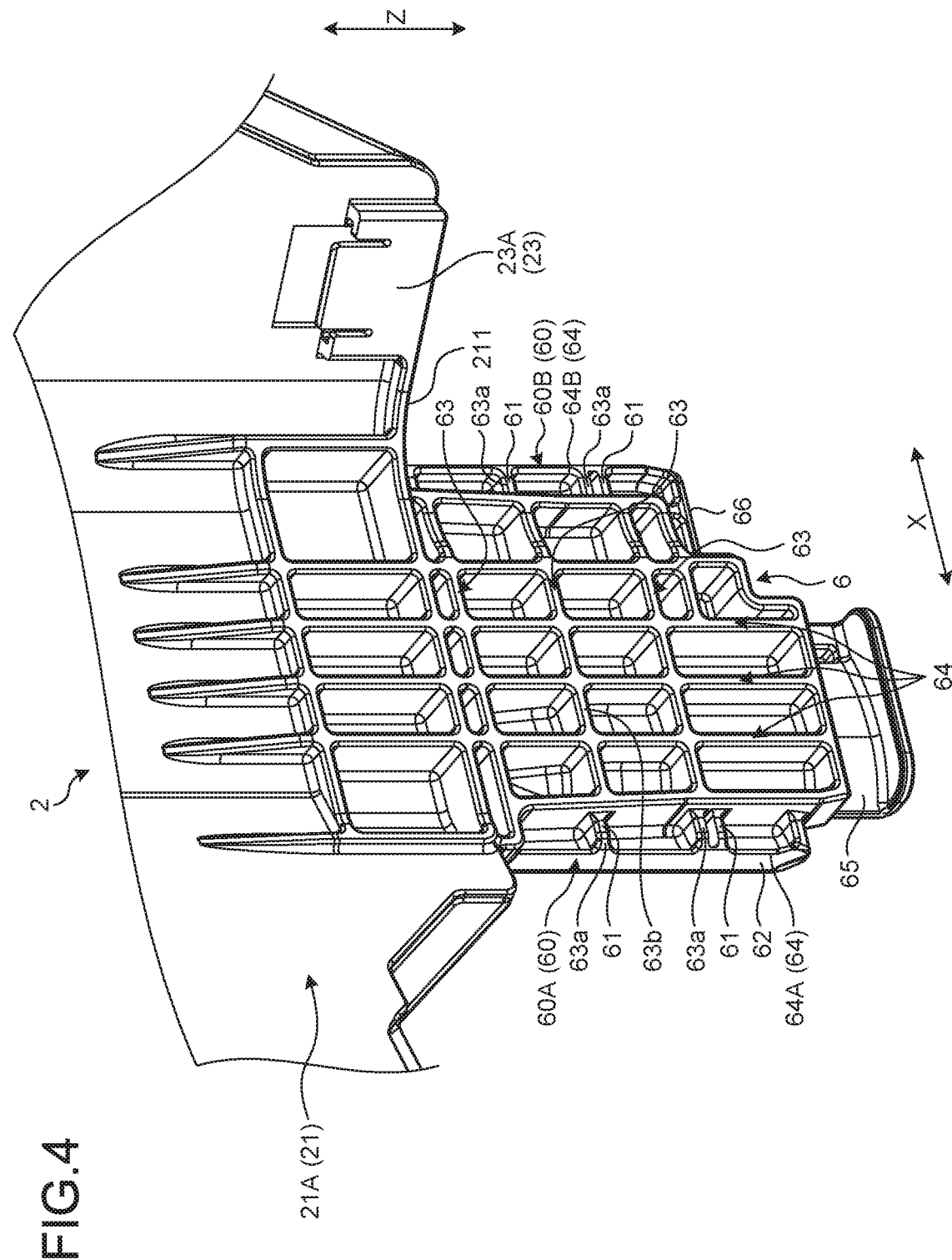
FIG. 4 is a perspective view of a protruded portion according to the embodiment.
Figure 5:
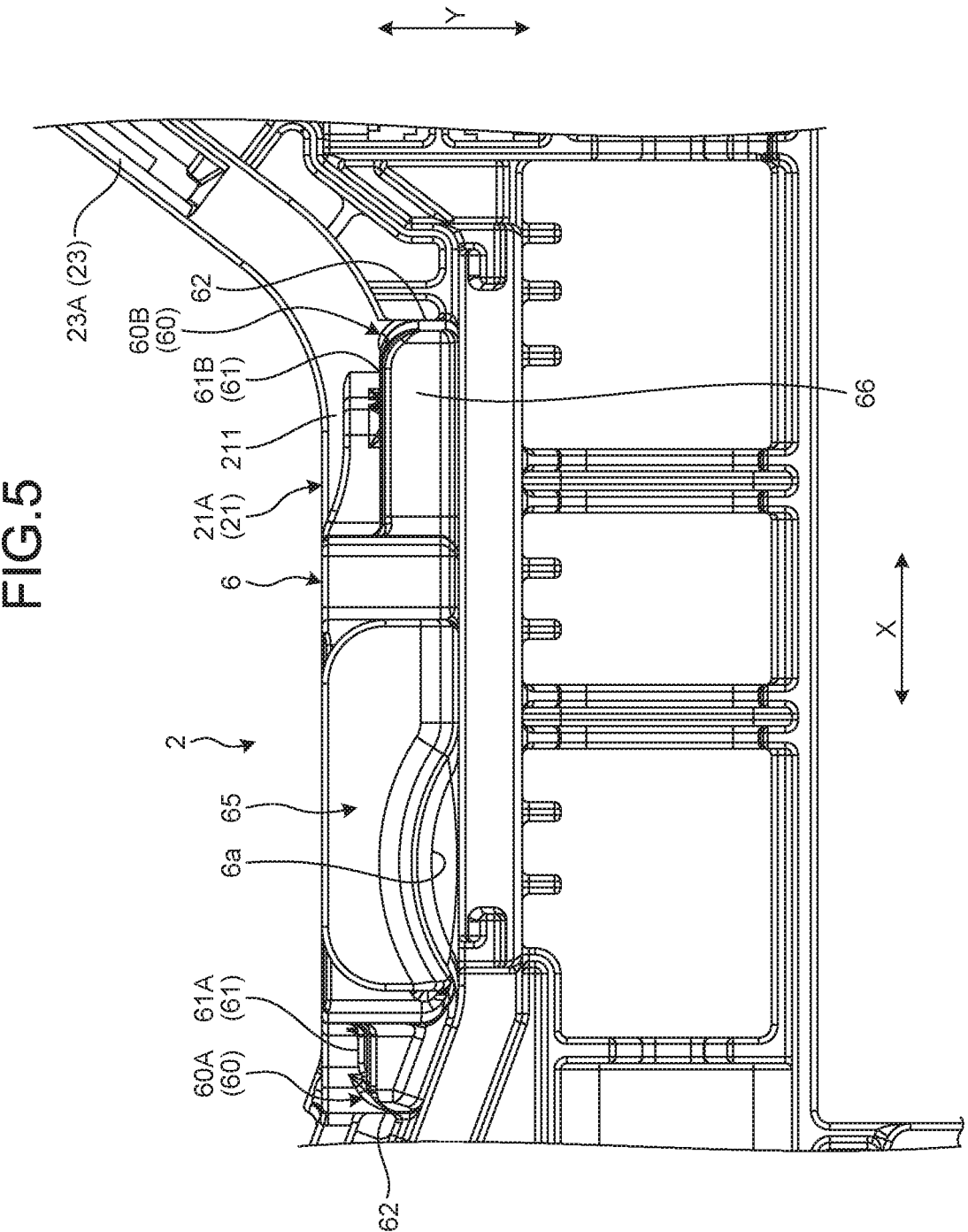
FIG. 5 is a bottom view of the protruded portion according to the embodiment.
Figure 6:
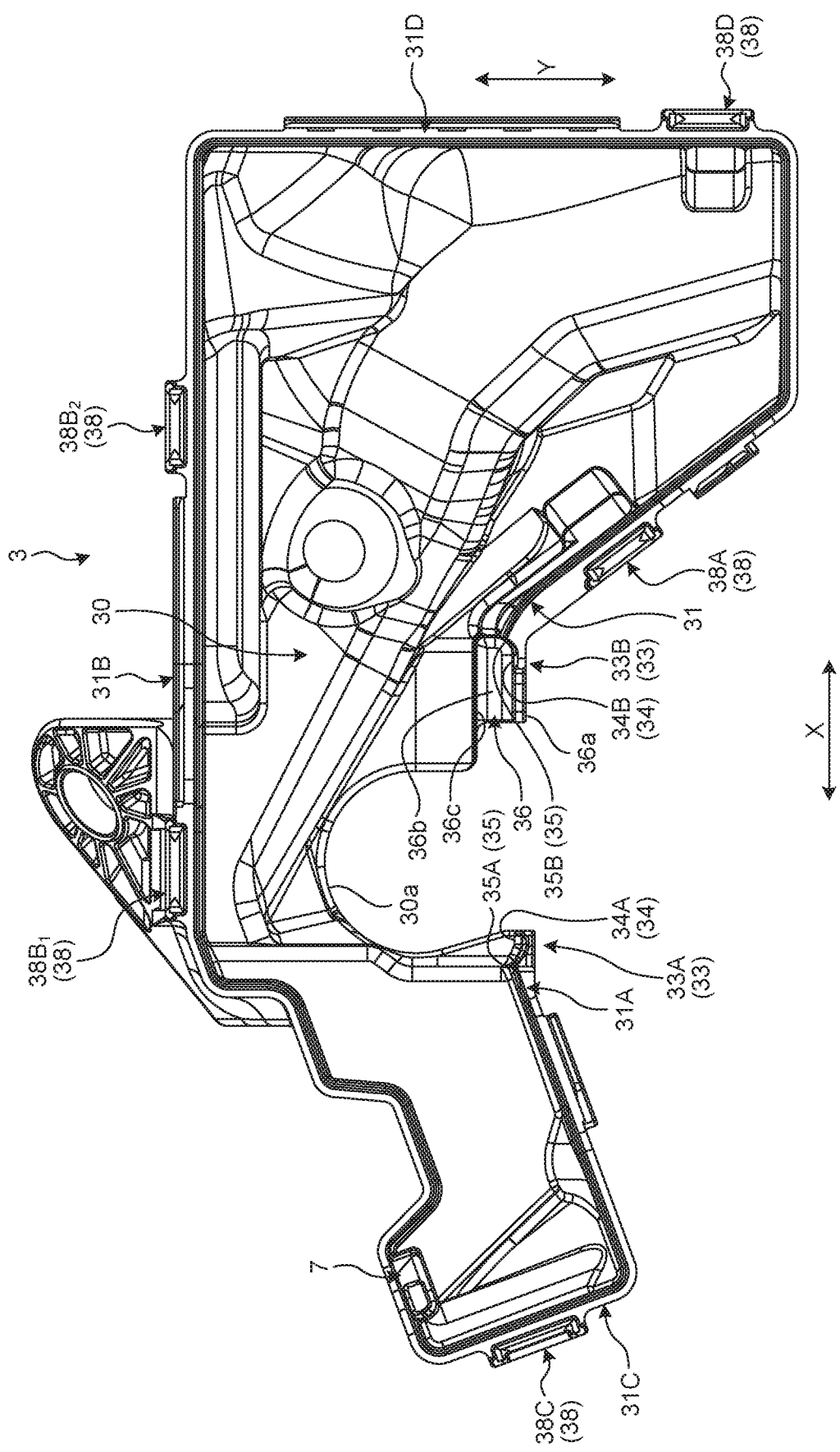
FIG. 6 is a plan view of a lower cover according to the embodiment.
Figure 7:
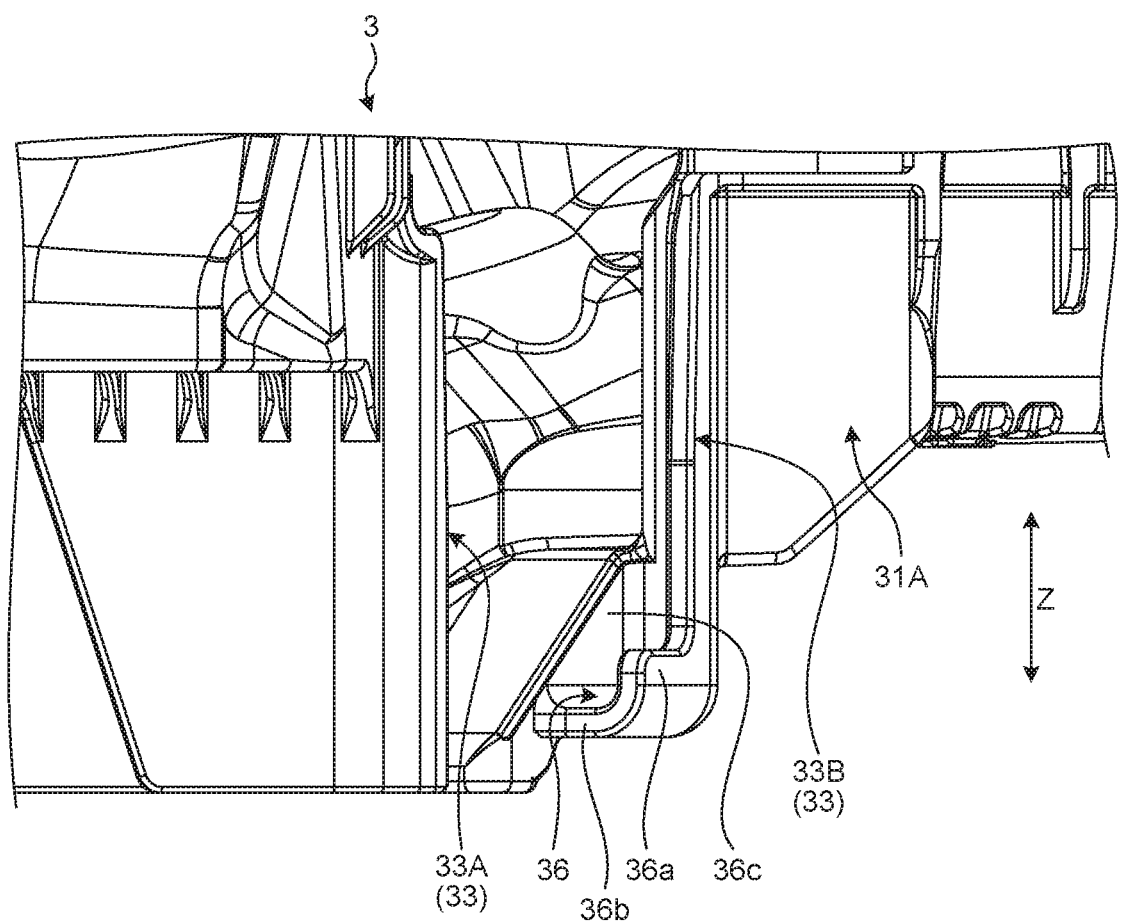
FIG. 7 is a perspective view of a vicinity of an edge portion in the lower cover of the embodiment.
Figure 8:
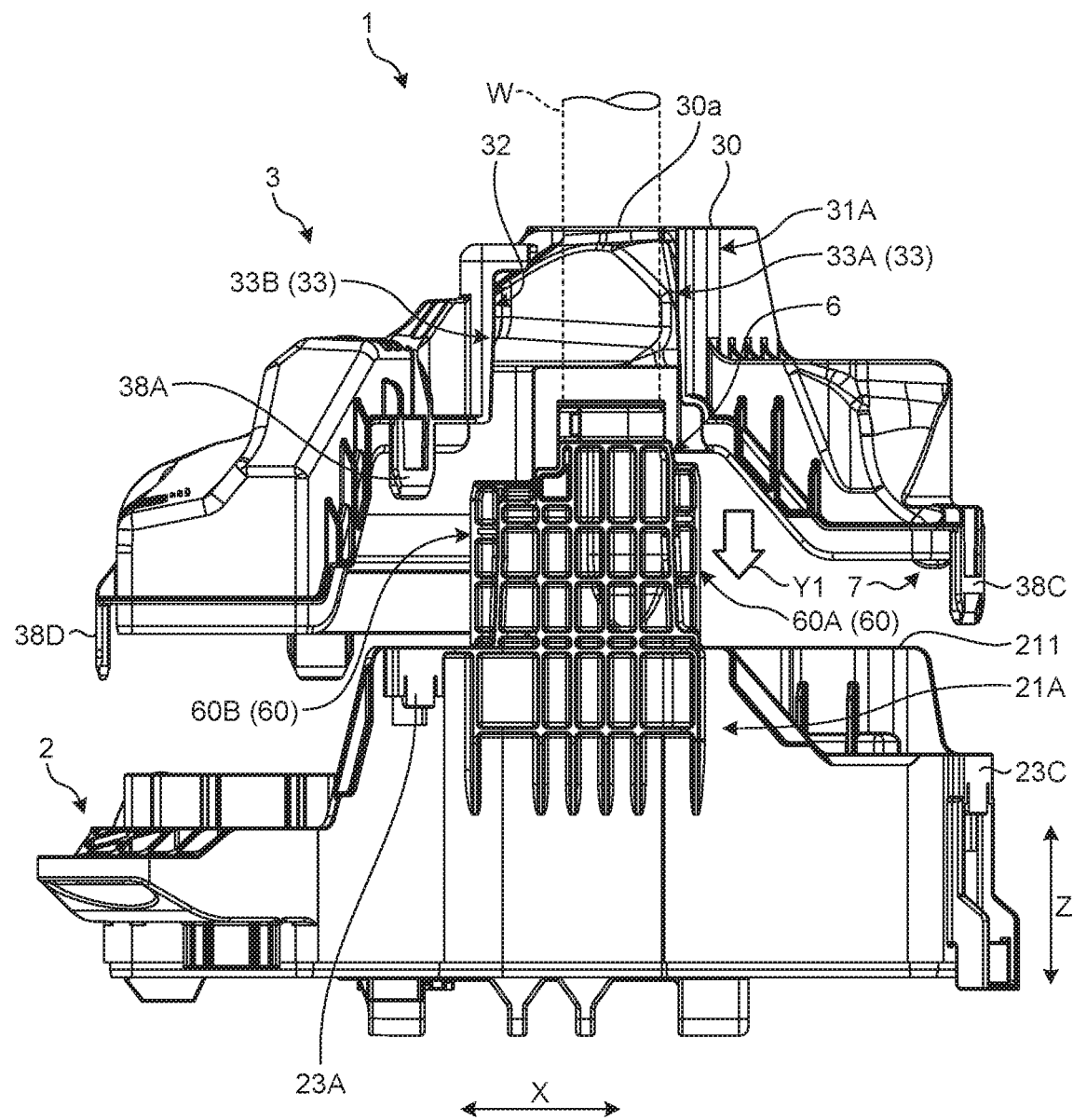
FIG. 8 is a front view for describing a fitting process of the embodiment.
Figure 9:
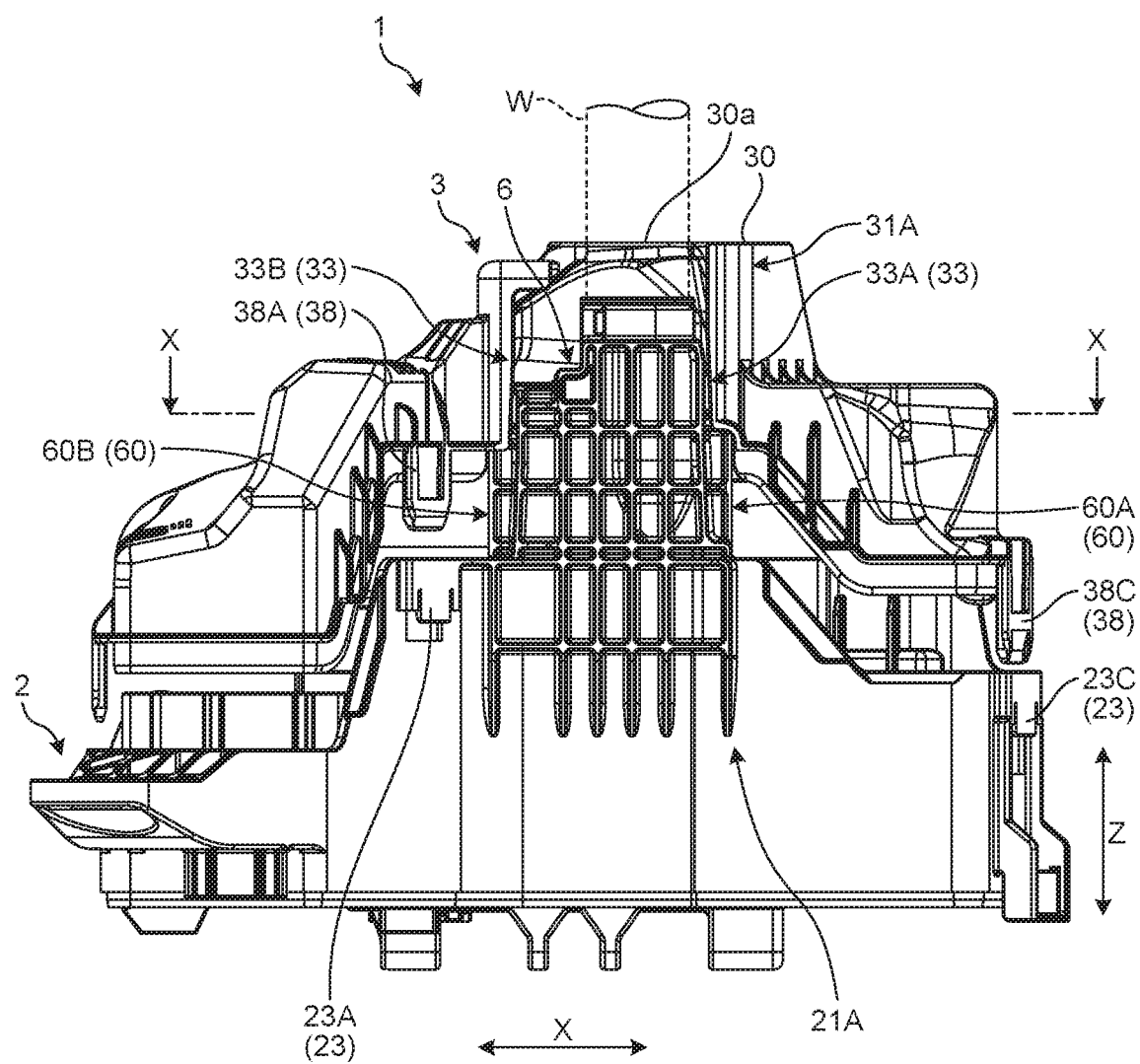
FIG. 9 is a front view of a state in which a side portion of the protruded portion and the edge portion of the lower cover face each other.
Figure 10:
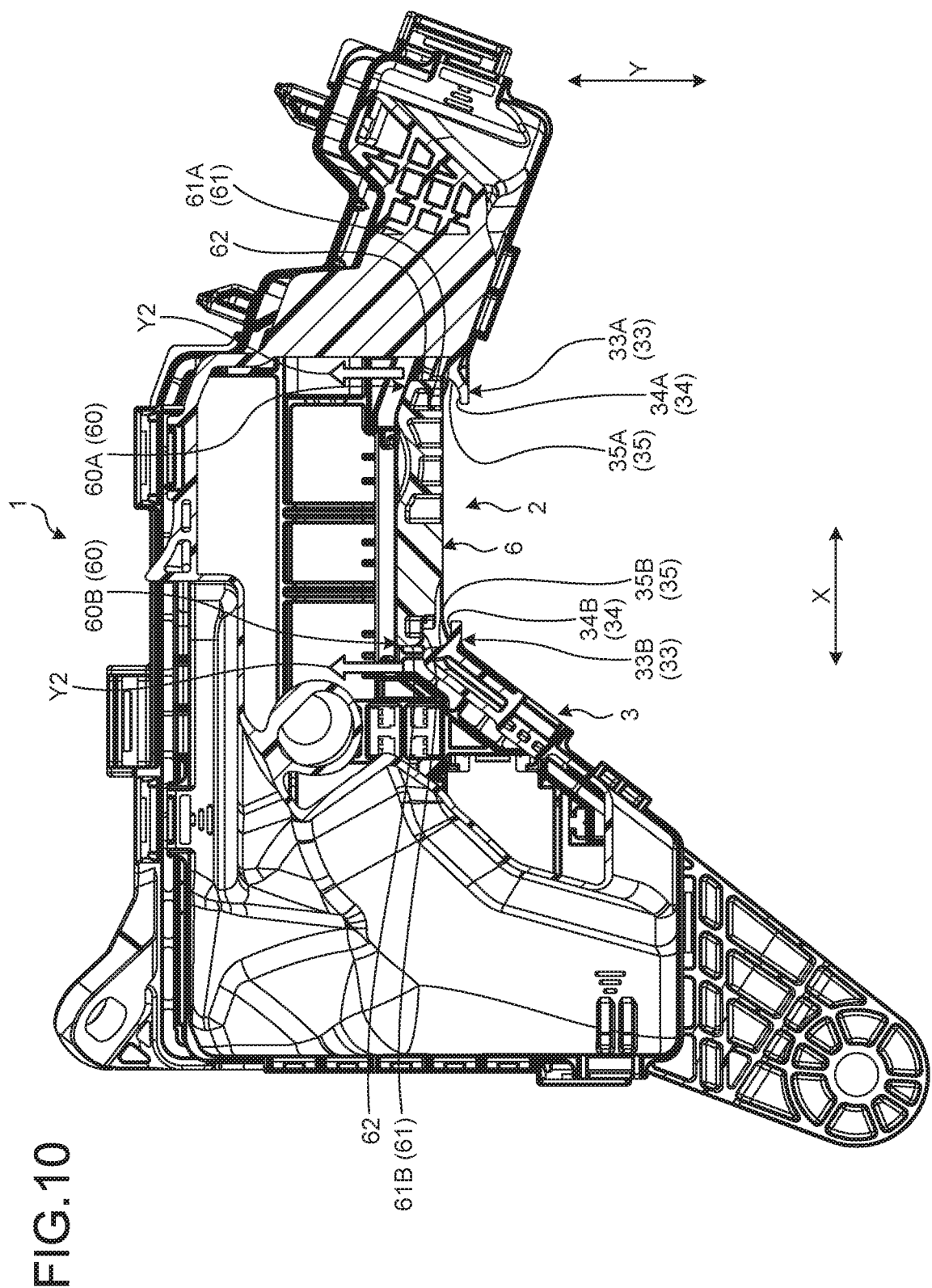
FIG. 10 is a sectional view of the state in which the side portion of the protruded portion and the edge portion of the lower cover face each other.
Figure 11:
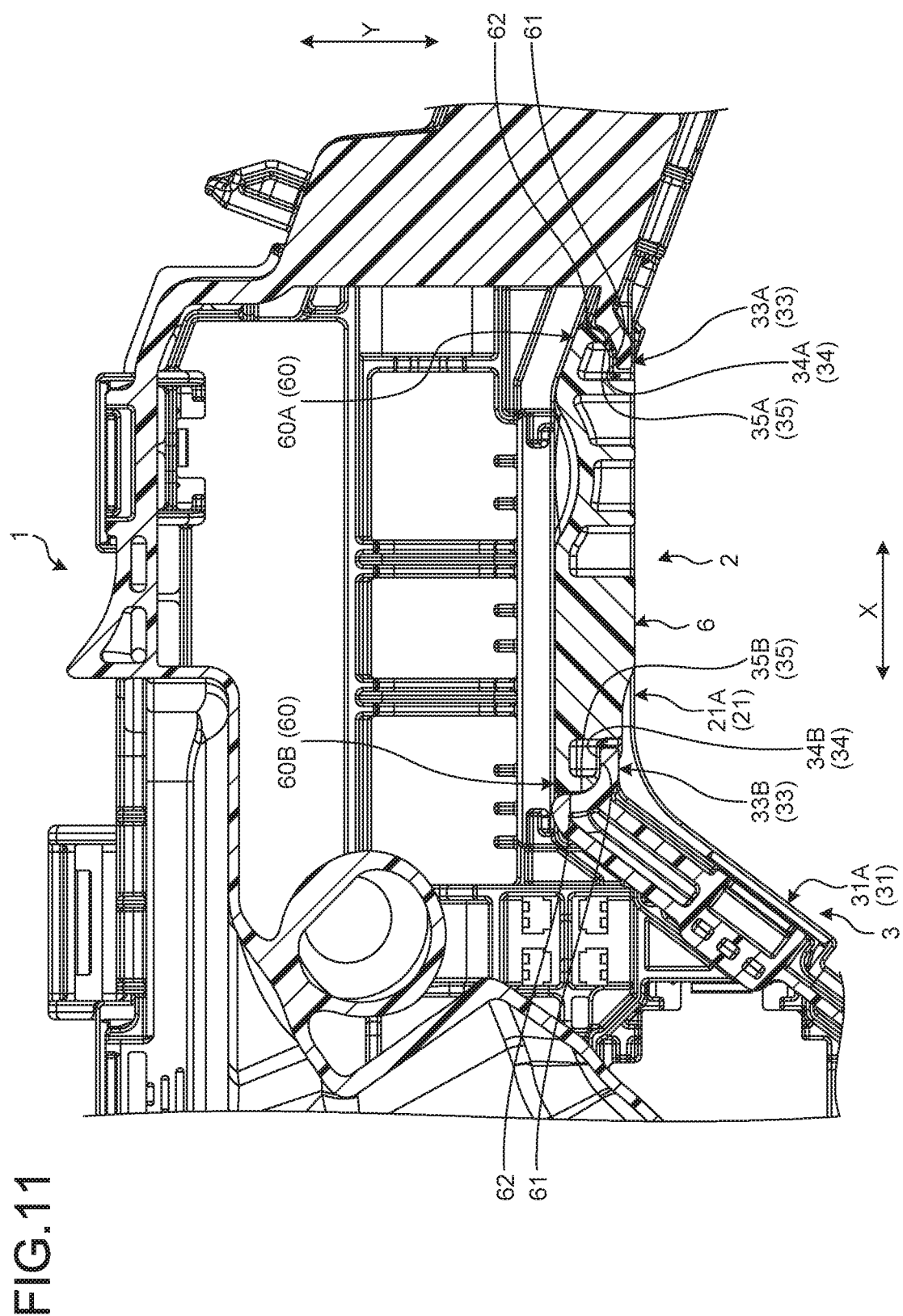
FIG. 11 is a sectional view of a state in which the edge portion abuts on the side portion.

An embodiment will be described with reference to FIG. 1 to FIG. 18. The present embodiment relates to an electric connection box. FIG. 1 is a perspective view of an electric connection box according to the embodiment, FIG. 2 is an exploded perspective view of the electric connection box according to the embodiment, FIG. 3 is a bottom view of a frame according to the embodiment, FIG. 4 is a perspective view of a protruded portion according to the embodiment, FIG. 5 is a bottom view of the protruded portion according to the embodiment, FIG. 6 is a plan view of a lower cover according to the embodiment, FIG. 7 is a perspective view of a vicinity of an edge portion in the lower cover of the embodiment, FIG. 8 is a front view for describing a fitting process of the embodiment, FIG. 9 is a front view of a state in which a side portion of the protruded portion and the edge portion of the lower cover face each other, FIG. 10 is a sectional view of a state in which the side portion of the protruded portion and the edge portion of the lower cover face each other, and FIG. 11 is a sectional view of a state in which the edge portion abuts on the side portion. A X-X cross section of FIG. 9 is illustrated in FIG. 10.

Figure 12:
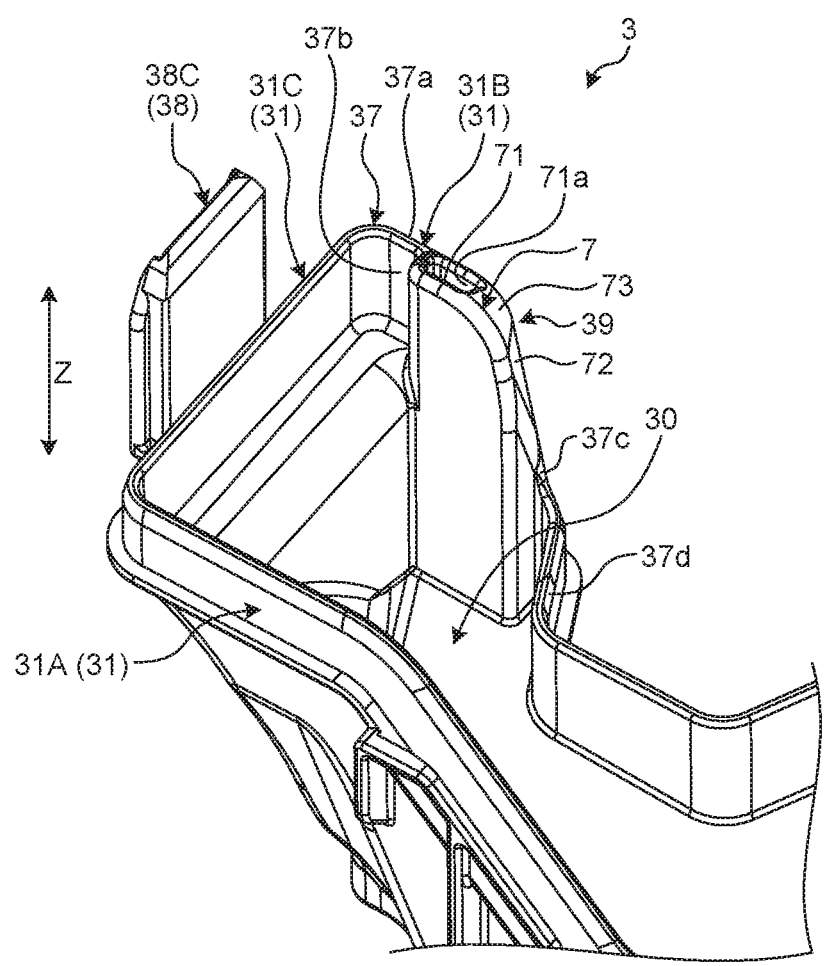
FIG. 12 is a perspective view of a vicinity of a thick portion in the lower cover of the embodiment.
Figure 13:
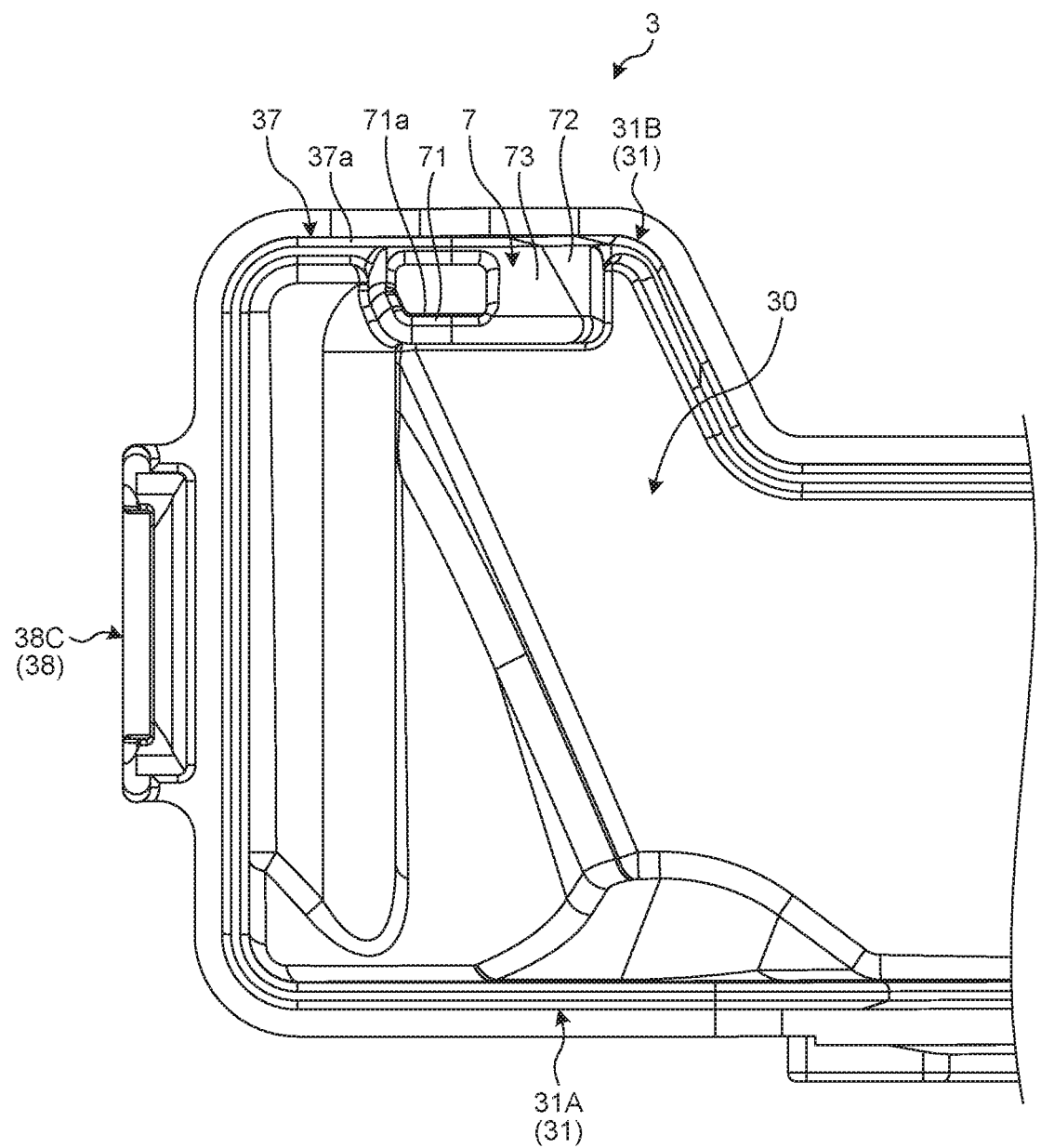
FIG. 13 is a plan view of the vicinity of the thick portion in the lower cover of the embodiment.
Figure 14:
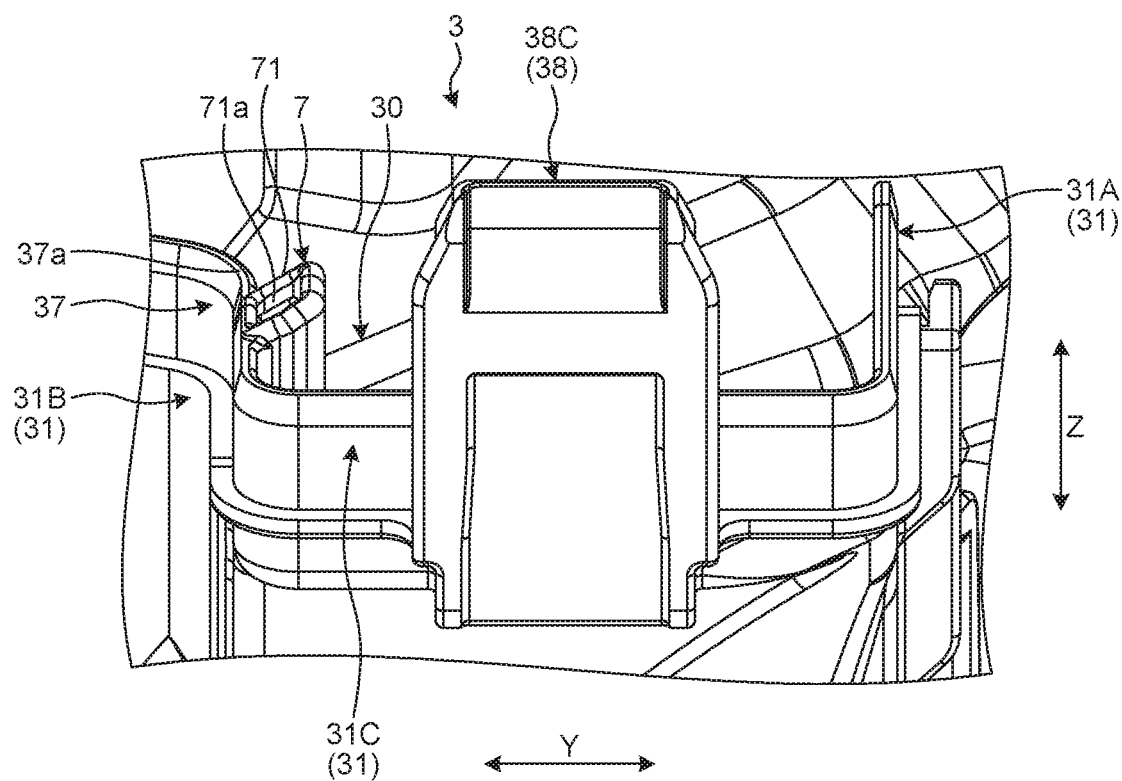
FIG. 14 is a perspective view of the vicinity of the thick portion in the lower cover of the embodiment.
Figure 15:
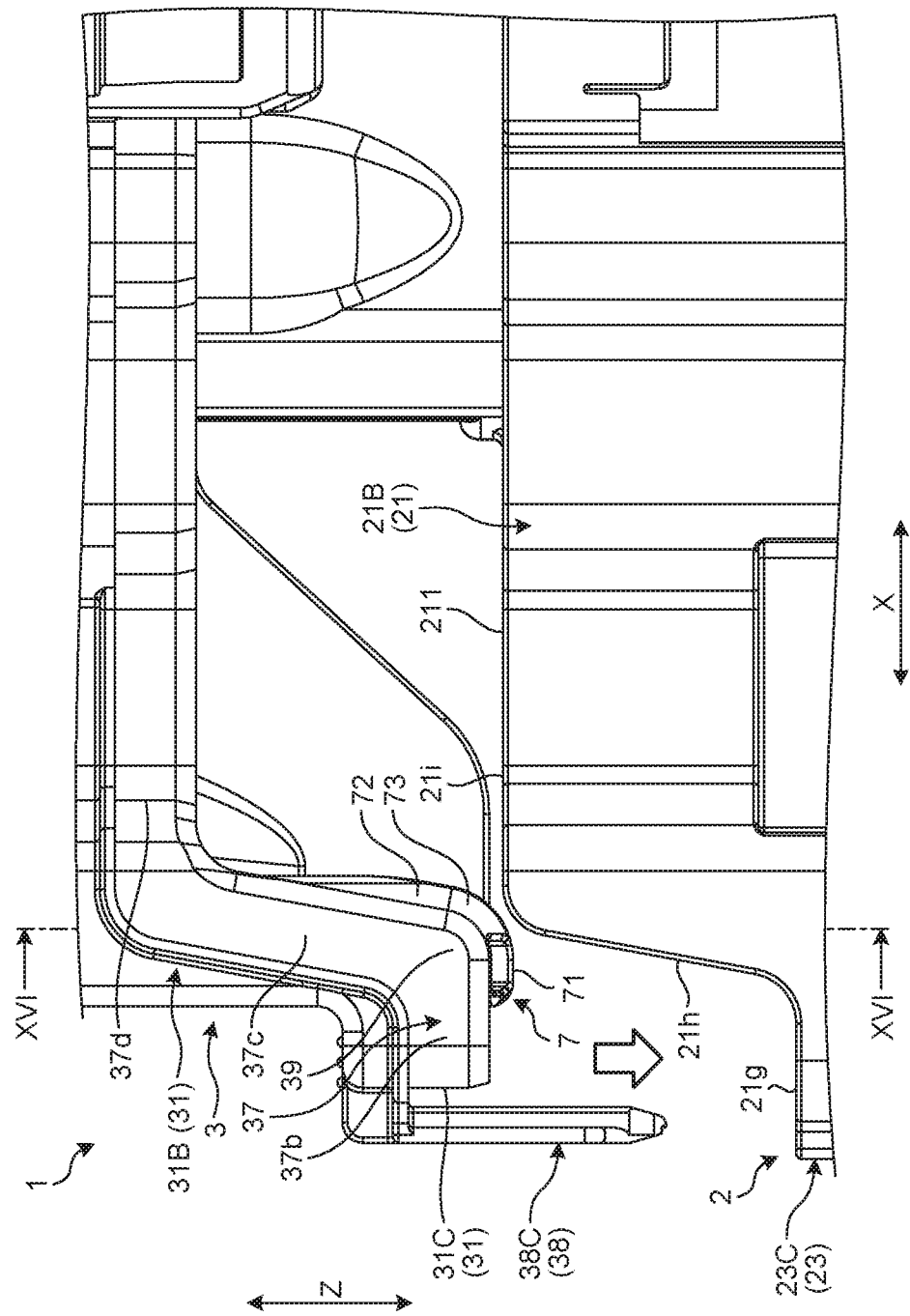
FIG. 15 is an enlarged view for explaining a fitting process of the embodiment.
Figure 16:
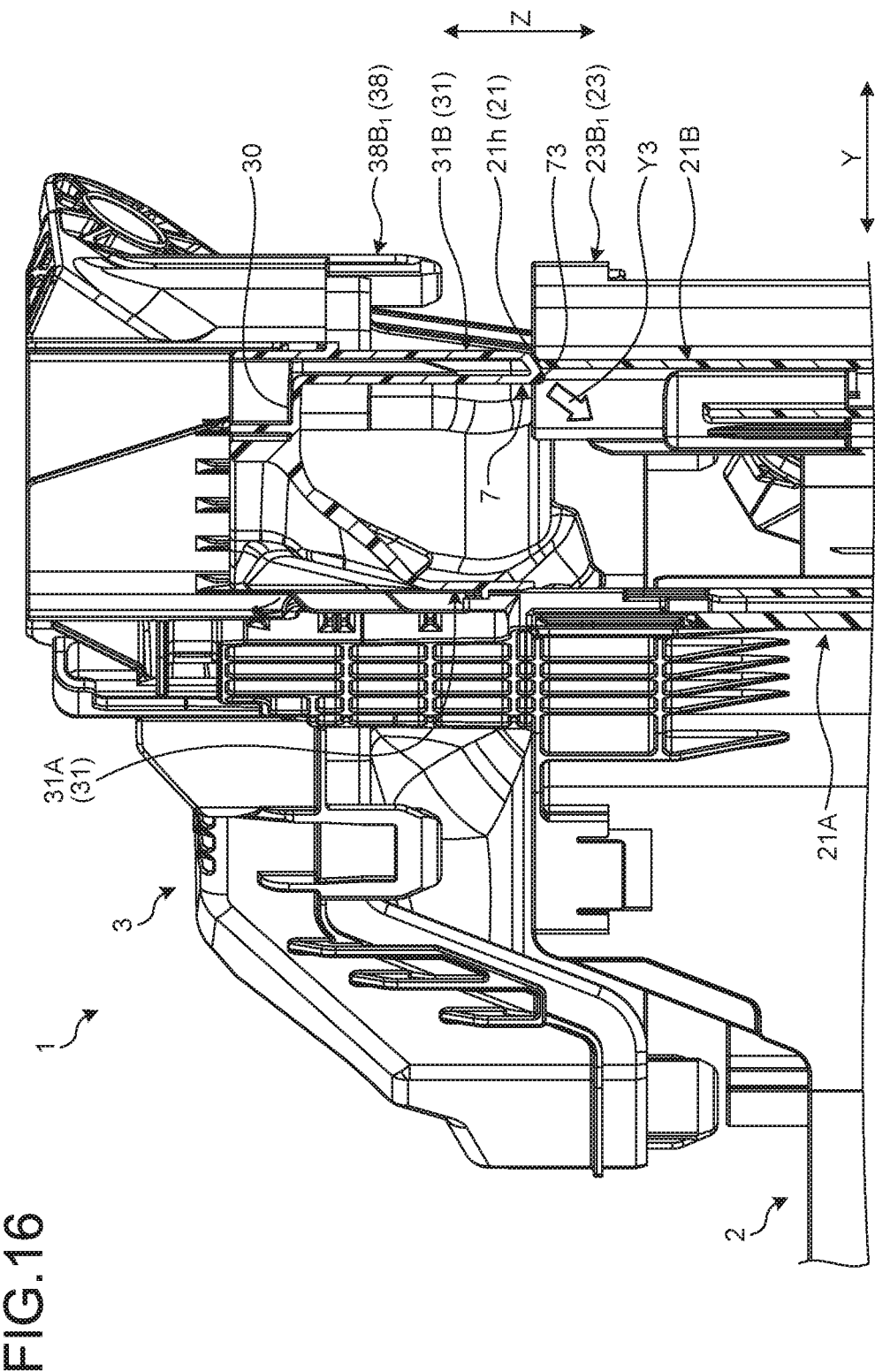
FIG. 16 is a sectional view of a state in which the thick portion abuts on an outer wall.
Figure 17:
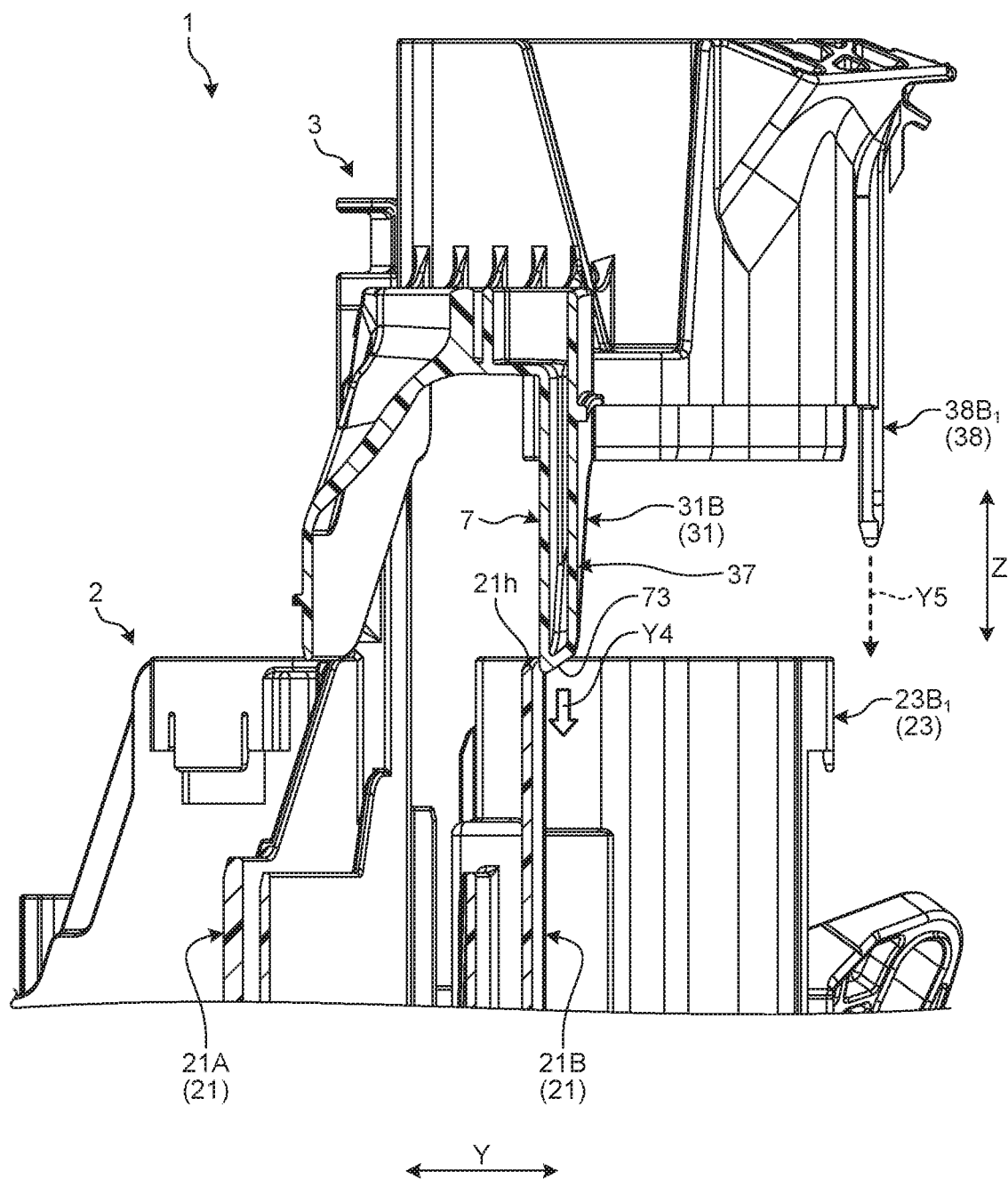
FIG. 17 is a sectional view illustrating a state in which the thick portion is placed outside the outer wall.
Figure 18:
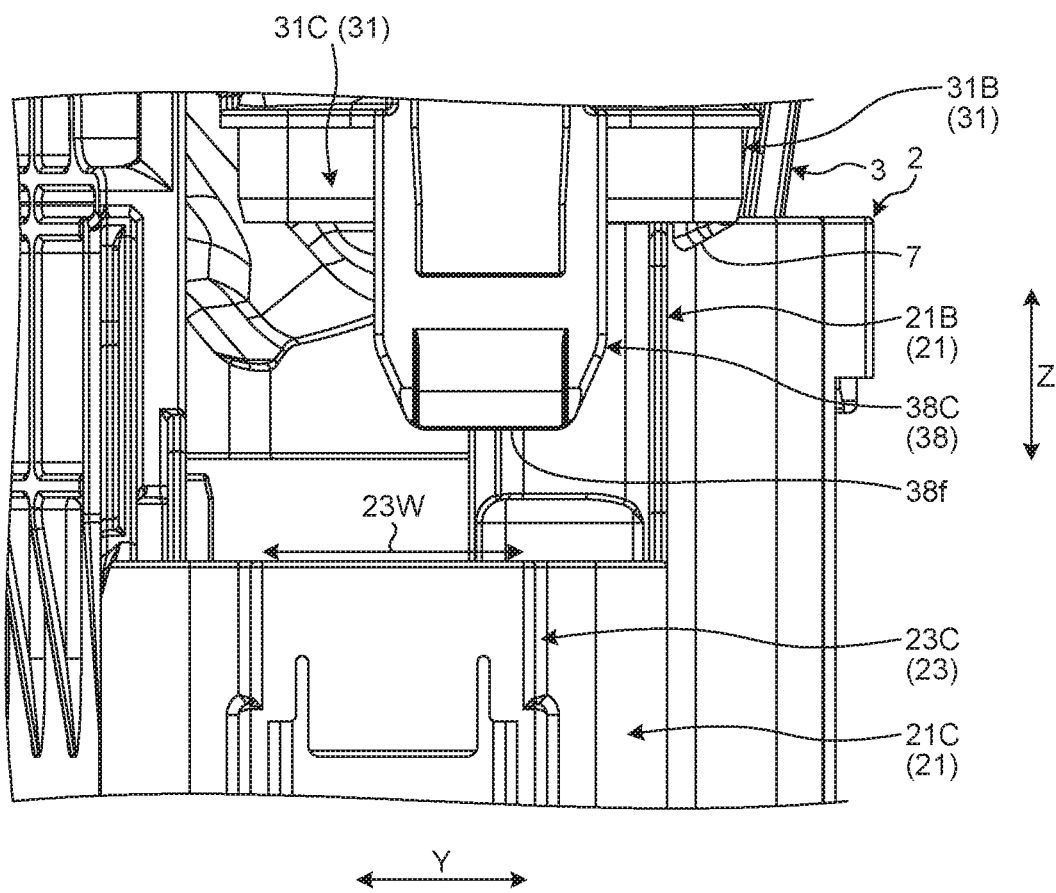
FIG. 18 is a view illustrating a positional relationship between a first engagement element and a second engagement element.

FIG. 12 is a perspective view of a vicinity of a thick portion in the lower cover of the embodiment, FIG. 13 is a plan view of the vicinity of the thick portion in the lower cover of the embodiment, FIG. 14 is a perspective view of the vicinity of the thick portion in the lower cover of the embodiment, FIG. 15 is an enlarged view for describing a fitting process of the embodiment, FIG. 16 is a sectional view of a state in which the thick portion abuts on the outer wall, FIG. 17 is a sectional view illustrating a state in which the thick portion is placed outside the outer wall, and FIG. 18 is a view illustrating a positional relationship between a first engagement element and a second engagement element. A XVI-XVI cross section of FIG. 15 is illustrated in FIG. 16.

As illustrated in FIG. 1 and FIG. 2, an electric connection box 1 according to the present embodiment includes a frame 2, a lower cover 3, and an upper cover 4. Also, a wire harness 100 according to the present embodiment includes the electric connection box 1 and an electric wire W. The wire harness 100 is mounted in a vehicle such as an automobile, and connects devices mounted in the vehicle. The wire harness 100 includes a plurality of electric wires W used for power supply or signal communication. One end of each electric wire W is connected, for example, to an electronic component housed in the electric connection box 1. The other end of each electric wire W is connected, for example, to each device (external device) such as a battery or an electric component via a connector or the like. There is a case where the electric connection box 1 is called a junction box, a fuse box, a relay box, or the like according to a kind of a housed electronic component. However, these are collectively called an "electric connection box" in the present embodiment.

As illustrated in FIG. 2, the frame 2 has a cylindrical outer wall 21 and a partition wall 24. The outer wall 21 and the partition wall 24 are integrally formed of an insulating synthetic resin or the like. The outer wall 21 forms a housing space 22 that houses an electronic component. As illustrated in FIG. 2, a block 5 is housed in the housing space 22. The block 5 holds various electronic components and is fixed to the frame 2. The electronic components are fixed to the outer wall 21 via the block 5, for example. Both ends in an axial direction of the outer wall 21 of the present embodiment are open.

The lower cover 3 is fitted to a first end portion 211, which is one end in the axial direction of the outer wall 21, and closes the first end portion 211. That is, the lower cover 3 is a cover that closes an opening of the first end portion 211. The upper cover 4 is fitted to a second end portion 212, which is the other end in the axial direction of the outer wall 21, and closes the second end portion 212. That is, the upper cover 4 is a cover that closes an opening of the second end portion 212.

As illustrated in FIG. 3, a shape of the outer wall 21 of when viewed in the axial direction is an elongated shape having a longitudinal direction and a lateral direction. In the present embodiment, the longitudinal direction of the outer wall 21 is referred to as a "first direction X", and the lateral direction of the outer wall 21 is referred to as a "second direction Y". The first direction X and the second direction Y are orthogonal. In the present embodiment, the axial direction of the outer wall 21 is referred to as a "third direction Z". The first direction X and the second direction Y are directions orthogonal to the third direction Z.

The outer wall 21 surrounds the housing space 22. The outer wall 21 has a first wall portion 21A, a second wall portion 21B, a third wall portion 21C, and a fourth wall portion 21D. The first wall portion 21A and the second wall portion 21B are wall portions extended in the first direction X. The first wall portion 21A and the second wall portion 21B face each other in the second direction Y. The third wall portion 21C and the fourth wall portion 21D are wall portions extended in the second direction Y. The third wall portion 21C connects one end of the first wall portion 21A and one end of the second wall portion 21B. The fourth wall portion 21D connects the other end of the first wall portion 21A and the other end of the second wall portion 21B. The third wall portion 21C and the fourth wall portion 21D face each other in the first direction X.

A plurality of fixation portions 21e and 21f is protruded from an outer side surface of the outer wall 21. The fixation portions 21e and 21f are portions fixed to a body of a vehicle, or the like and have through holes.

A plurality of first engagement elements 23 is provided in the outer side surface of the outer wall 21.

Each of the first engagement elements 23 is a component formed in a hollow cylindrical shape, and is extended in the third direction Z. The first engagement element 23 has an engagement claw 23x. The outer wall 21 of the present embodiment has five first engagement elements 23A, $23B_1$, $23B_2$, 23C, and 23D. The first engagement element 23A is arranged in the first wall portion 21A. The two first engagement elements $23B_1$ and $23B_2$ are arranged in the second wall portion 21B. The first engagement element 23C is arranged in the third wall portion 21C, and the first engagement element 23D is arranged in the fourth wall portion 21D.

As illustrated in FIG. 2 to FIG. 4, the first end portion 211 of the outer wall 21 has a protruded portion 6. The protruded portion 6 is a plate-shaped configuration portion protruded in the third direction Z. As seen from FIG. 4 and the like, a shape of the protruded portion 6 according to the present embodiment in a front view is substantially rectangular. The protruded portion 6 is arranged on the first wall portion 21A. The protruded portion 6 is arranged, for example, near the center in the first direction X of the first wall portion 21A. As illustrated in FIG. 3, the first wall portion 21A of the present embodiment is bent at a position adjacent to the protruded portion 6. A width direction of the protruded portion 6 is the first direction X, and a thickness direction of the protruded portion 6 is the second direction Y.

As illustrated in FIG. 4, a plurality of first ribs 63 and a plurality of second ribs 64 are formed in the protruded portion 6. The first ribs 63 and the second ribs 64 are arranged on the outer side surface of the protruded portion 6. The first ribs 63 and the second ribs 64 are protruded in the second direction Y. The first ribs 63 are ribs extended in the first direction X. The plurality of first ribs 63 is in parallel with each other and is arrayed at predetermined intervals in the third direction Z. The second ribs 64 are ribs extended in the third direction Z. The plurality of second ribs 64 is in parallel with each other and is arrayed at predetermined intervals in the first direction X.

The protruded portion 6 has a pair of side portions 60A and 60B extended in the third direction Z. Between the pair of side portions 60A and 60B, the first side portion 60A is placed at one end in the width direction of the protruded portion 6, and a second side portion 60B is placed at the other end in the width direction. In the following description, the first side portion 60A and the second side portion 60B are simply referred to as "side portions 60" in a case of being collectively referred to. Each of the side portions 60 is open in two directions that are the first direction X and the second direction Y. The side portion 60 has a first guide surface 61 and a second guide surface 62. The first guide surface 61 is a surface exposed in a thickness direction of the protruded portion 6. The second guide surface 62 is a surface exposed to the outside in the width direction of the protruded portion 6.

The first guide surface 61 of the present embodiment is a leading end surface in the protrusion direction of each of the first ribs 63. The first guide surface 61 faces an outer side of the frame 2. The first guide surface 61 includes an end portion 63a in the first direction X of the first rib 63. In the first rib 63, the end portion 63a in the first direction X has a lower height of a protrusion than a central portion 63b in the first direction X. A plurality of first guide surfaces 61 is arrayed in the third direction Z on the protruded portion 6. The plurality of first guide surfaces 61 is placed on a common plane. That is, the plurality of first ribs 63 are formed in such a manner as to configure an imaginary plane by leading end surfaces of the end portions 63a. When the lower cover 3 abuts on the plurality of first guide surfaces 61, a posture of the lower cover 3 is stabilized. In other words, the protruded portion 6 has a virtual plane that makes surface contact with the lower cover 3 in a wide area in the third direction Z.

The second guide surface 62 is a side surface of each of the second ribs 64. Second ribs 64A and 64B are respectively provided at both ends in the first direction X of the protruded portion 6. The second rib 64A is a rib provided on the first side portion 60A, and the second rib 64B is a rib provided on the second side portion 60B. The second guide surface 62 of the first side portion 60A is a side surface of the second rib 64A. The second guide surface 62 of the second side portion 60B is a side surface of the second rib 64B. The second guide surface 62 of the first side portion 60A and the second guide surface 62 of the second side portion 60B face opposite directions.

A fixation portion 65 is provided at a leading end portion of the protruded portion 6. The fixation portion 65 has a groove extended in the first direction X. This groove is formed in the outer side surface of the protruded portion 6. The fixation portion 65 is a portion around which a fixing member to fix the electric wire W is wound. As illustrated in FIG. 1, the electric wire W is pulled out from the electric connection box 1 along the protruded portion 6. A bundle of electric wires W is fixed to the fixation portion 65 by a band, a tape, or the like.

As illustrated in FIG. 5, a recessed portion 6a corresponding to an electric wire W is formed in the inner side surface of the protruded portion 6. A cross-sectional shape of the recessed portion 6a is an arc shape. The recessed portion 6a is extended in the third direction Z, and an extension area thereof is an area on a leading end side of the center in the third direction Z. The electric wire W is routed along the recessed portion 6a and is pulled out from the electric connection box 1.

As illustrated in FIG. 4 and FIG. 5, a held portion 66 is provided at the leading end portion of the protruded portion 6. The held portion 66 is a portion adjacent to the fixation portion 65 in the first direction X. In the held portion 66, a height of a protrusion of a first rib 63 and a second rib 64 is made low. The held portion 66 is held by the lower cover 3 as described later.

As illustrated in FIG. 6, the lower cover 3 has a bottom wall 30 and a side wall 31. The bottom wall 30 and the side wall 31 are integrally molded of an insulating synthetic resin or the like. The bottom wall 30 is a wall portion that faces the housing space 22 of the frame 2 in the third direction Z. The side wall 31 is a wall portion fitted into the outer wall 21 of the frame 2. More specifically, the side wall 31 is fitted into the first end portion 211 of the outer wall 21 in the third direction Z. When the side wall 31 is fitted into the outer wall 21, the first end portion 211 is closed by the lower cover 3.

The side wall 31 is provided to stand in the third direction Z from an edge portion of the bottom wall 30. The side wall 31 has a first wall portion 31A, a second wall portion 31B, a third wall portion 31C, and a fourth wall portion 31D. The first wall portion 31A is a wall portion corresponding to the first wall portion 21A of the frame 2. Similarly, the second wall portion 31B, the third wall portion 31C, and the fourth wall portion 31D of the lower cover 3 are wall portions respectively corresponding to the second wall portion 21B, the third wall portion 21C, and the fourth wall portion 21D of the frame 2. The first wall portion 31A and the second wall portion 31B are extended in the first direction X, and face each other in the second direction Y. The third wall portion 31C connects one end of the first wall portion 31A and one end of the second wall portion 31B. The fourth wall portion 31D connects the other end of the first wall portion 31A and the other end of the second wall portion 31B. The third wall portion 31C and the fourth wall portion 31D are extended in the second direction Y, and face each other in the first direction X.

As illustrated in FIG. 2 and the like, the side wall 31 has an insertion wall portion 37. The insertion wall portion 37 is a portion of the side wall 31 which portion is inserted into an inner side of the outer wall 21 in the third direction Z. The insertion wall portion 37 is inserted into the frame 2 in the third direction Z, and faces the outer wall 21. The insertion wall portion 37 is a leading end portion in the third direction Z in the side wall 31. The insertion wall portion 37 is extended in a circumferential direction around the side wall 31. The circumferential direction is a direction around an edge of the bottom wall 30, that is, a direction around an inner side surface of the outer wall 21. The insertion wall portion 37 is provided in an almost whole circumference of the side wall 31.

A plurality of second engagement elements 38 is provided in the side wall 31. Each of the second engagement elements 38 is a plate-shaped configuration portion and is extended along the third direction Z. A leading end portion of the second engagement element 38 is protruded in the third direction Z from the leading end portion of the side wall 31. The second engagement element 38 has a recessed portion 38x engaged with an engagement claw 23x of a first engagement element 23.

The side wall 31 of the present embodiment has five second engagement elements 38A, 38B$_1$, 38B$_2$, 38C, and 38D. The second engagement element 38A is provided in the first wall portion 31A, and is arranged in a position corresponding to the first engagement element 23A of the frame 2. The two second engagement elements 38B$_1$ and 38B$_2$ are arranged in the second wall portion 31B. The second engagement elements 38B$_1$ and 38B$_2$ are respectively arranged in positions corresponding to the two first engagement elements 23B$_1$ and 23B$_2$ of the frame 2. The second engagement element 38C is provided in the third wall portion 31C, and is arranged in a position corresponding to the first engagement element 23C of the frame 2. The second engagement element 38D is provided in the fourth wall portion 31D, and is arranged in a position corresponding to the first engagement element 23D of the frame 2.

The first wall portion 31A has a notched portion 32 having a shape corresponding to the protruded portion 6 of the frame 2. The notched portion 32 is provided in a position corresponding to the protruded portion 6. The notched portion 32 divides the first wall portion 31A into a portion placed on one side in the first direction X and a portion placed on the other side in the first direction X. In other words, the notched portion 32 is also a wide slit provided in the first wall portion 31A. A shape of the notched portion 32 of a case where the first wall portion 31A is viewed from the front is substantially rectangular.

The first wall portion 31A has a pair of edge portions 33 (first edge portion 33A and second edge portion 33B) sandwiching the notched portion 32. In other words, the first wall portion 31A has a notch between the pair of edge portions 33A and 33B. The pair of edge portions 33A and 33B is extended in the third direction Z. The pair of edge portions 33A and 33B respectively correspond to the pair of side portions 60A and 60B. The first edge portion 33A corresponds to the first side portion 60A, and the second edge portion 33B corresponds to the second side portion 60B.

The first edge portion 33A and the second edge portion 33B face each other in the first direction X. Each of the pair of edge portions 33A and 33B has a first facing surface 34 and a second facing surface 35. The first facing surface 34 is a surface that faces the second direction Y and is a plane, for example. The first facing surface 34 abuts on the pair of side portions 60A and 60B in the second direction Y. The second facing surface 35 is a surface that faces the first direction X and is a plane, for example. The second facing surface 35 faces the pair of side portions 60A and 60B in the first direction X.

In the following description, in a case where a first facing surface 34 of the first edge portion 33A and a first facing surface 34 of the second edge portion 33B are distinguished, what belongs to the first edge portion 33A is referred to as a first facing surface 34A and what belongs to the second edge portion 33B is referred to as a first facing surface 34B. Also, in a case where a second facing surface 35 of the first edge portion 33A and a second facing surface 35 of the second edge portion 33B are distinguished, what belongs to the first edge portion 33A is referred to as a second facing surface 35A and what belongs to the second edge portion 33B is referred to as a second facing surface 35B.

The two first facing surfaces 34A and 34B face the same side in the second direction Y. More specifically, the two first facing surfaces 34A and 34B of the present embodiment face an inner side of the lower cover 3 and face the second wall portion 31B. The two second facing surfaces 35A and 35B face each other in the first direction X.

The lower cover 3 has a holding portion 36. The holding portion 36 holds the held portion 66 of the frame 2. As illustrated in FIG. 7, the holding portion 36 of the present embodiment is a groove-shaped recessed portion. The holding portion 36 has an outer side wall portion 36a, a connection wall portion 36b, and an inner side wall portion 36c.

The outer side wall portion 36a is connected to the second edge portion 33B, and is extended in the first direction X from the second edge portion 33B toward the first edge portion 33A. The outer side wall portion 36a and the inner side wall portion 36c face each other in the second direction Y and are extended in the third direction Z. The connection wall portion 36b connects an end portion of the outer side wall portion 36a and an end portion of the inner side wall portion 36c, and is substantially orthogonal to the third direction Z. When the lower cover 3 is fitted into the frame 2, the held portion 66 of the frame 2 is inserted into the holding portion 36 and fitted into the holding portion 36.

As illustrated in FIG. 6 and the like, the bottom wall 30 has an insertion portion 30a. The insertion portion 30a is a notched portion through which the electric wire W is inserted. The electric wire W is pulled out from the inside of the electric connection box 1 to an external space via the insertion portion 30a. In the electric connection box 1 of the present embodiment, a passage of the electric wire W pulled out of the housing space 22 is formed by the insertion portion 30a and the protruded portion 6 of the frame 2.

A fitting process of fitting the frame 2 and the lower cover 3 is performed in a procedure described with reference to FIG. 8 to FIG. 11, for example. In the fitting process, the lower cover 3 is fitted into the frame 2 from the above, as illustrated in FIG. 8. The frame 2 is placed on a placement table or the like with the protruded portion 6 facing upward. A worker lowers the lower cover 3 to a position in which the edge portion 33 of the lower cover 3 faces the side portion 60 of the protruded portion 6. Here, the worker lowers the lower cover 3 in such a manner as to bring the notched portion 32 closer to the protruded portion 6 while holding the lower cover 3 in a posture in which the bottom wall 30 faces upward. The worker can lower the lower cover 3 while pressing the insertion portion 30a against the electric wire W.

The worker makes the edge portion 33 face the side portion 60 as illustrated in FIG. 9 and FIG. 10. The lower cover 3 is positioned in such a manner that the edge portion 33 faces the side portion 60 from the outside. In the electric connection box 1 of the present embodiment, it is possible to make the edge portion 33 face the side portion 60 before the first engagement element 23 and the second engagement element 38 come into contact with each other. In FIG. 9, a state in which a part of the edge portion 33 is made to face the side portion 60 is illustrated. Each second engagement element 38 is not in contact with each first engagement element 23 and is separated from each first engagement element 23 in the third direction Z. That is, in the present embodiment, it is possible to make the edge portion 33 face the side portion 60 before engagement of the first engagement element 23 and the second engagement element 38 is started. Thus, a position of the lower cover 3 with respect to the frame 2 is adjusted before the second engagement element 38 is inserted into the first engagement element 23.

As illustrated in the sectional view of FIG. 10, a first facing surface 34 faces a first guide surface 61 in the second direction Y. More specifically, one first facing surface 34A faces a first guide surface 61A of the first side portion 60A. The other first facing surface 34B faces a first guide surface 61B of the second side portion 60B. The worker moves the lower cover 3 in the second direction Y as indicated by an arrow Y2 in FIG. 10 and makes the first facing surface 34 abut on the first guide surface 61.

A state in which the first facing surface 34 abuts on the first guide surface 61 is illustrated in FIG. 11. The lower cover 3 is positioned with respect to the frame 2 in the second direction Y by abutting of each of the two first facing surfaces 34A and 34B on the first guide surface 61. Also, by surface contact between the lower cover 3 and the frame 2, an inclination of the lower cover 3 in the third direction Z is controlled. That is, due to the surface contact, an axial direction of the lower cover 3 and an axial direction of the frame 2 become parallel, and generation of erroneous fitting is controlled.

The second facing surface 35 faces the side portion 60 in the first direction X in a state in which the first facing surface 34 abuts on the first guide surface 61. A second facing surface 35A of the first edge portion 33A faces a second guide surface 62 of the first side portion 60A. A second facing surface 35B of the second edge portion 33B faces a second guide surface 62 of the second side portion 60B. In the protruded portion 6 of the present embodiment, a corner of the side portion 60 has a curved shape in such a manner that the protruded portion 6 can be easily inserted between the two second facing surfaces 35A and 35B. Also, the edge portion 33 has a curved surface between the first facing surface 34 and the second facing surface 35 in a manner corresponding to a curved shape of the side portion 60.

A size of a gap between the second facing surface 35 and the second guide surface 62 is determined in such a manner that the lower cover 3 can be appropriately positioned with respect to the frame 2. The size of the gap between the second facing surface 35 and the second guide surface 62 is, for example, a size with which positional displacement between a corresponding first engagement element 23 and second engagement element 38 can be controlled, that is, a size with which the second engagement element 38 can be correctly guided to the first engagement element 23. Also, the size of this gap is, for example, a size with which positional displacement between the outer wall 21 of the frame 2 and the side wall 31 of the lower cover 3 can be controlled, that is, a size with which the side wall 31 can be correctly guided to a space on the inner side of the outer wall 21.

The worker lowers the lower cover 3 while keeping the first facing surface 34 in contact with the first guide surface 61. Here, the second facing surfaces 35A and 35B and the second guide surface 62 control positional displacement of the lower cover 3 with respect to the frame 2. Since the second facing surfaces 35A and 35B sandwich the protruded portion 6 from both sides in the first direction X, positional displacement in the first direction X is regulated. As the lower cover 3 is lowered toward the frame 2, each second engagement element 38 is guided to a corresponding first engagement element 23. Also, the side wall 31 of the lower cover 3 is guided to the inner side of the frame 2. Thus, the worker can easily fit the lower cover 3 into the frame 2. When the second engagement element 38 is engaged with the first engagement element 23, the lower cover 3 is completely fitted into the frame 2 as illustrated in FIG. 1.

Also, as described in the following, the lower cover 3 of the present embodiment has a thick portion 7 that can make the work of fitting the lower cover 3 into the frame 2 easier. As illustrated in FIG. 12, the thick portion 7 is a part of the side wall 31 in the lower cover 3. The thick portion 7 of the present embodiment has a function of controlling generation of erroneous fitting between the frame 2 and the lower cover 3, and a function of correcting a relative position of the frame 2 and the lower cover 3 to a correct positional relationship.

As illustrated in FIG. 6, and FIG. 12 to FIG. 14, the thick portion 7 is provided in the second wall portion 31B. More specifically, the thick portion 7 is arranged at an end portion in the first direction X of the second wall portion 31B and is provided, for example, in the vicinity of the third wall portion 31C. The thick portion 7 is a portion in which a part of the second wall portion 31B is protruded toward the inner side of the lower cover 3. The thick portion 7 is provided at least in the insertion wall portion 37 of the second wall portion 31B. The thick portion 7 is extended in the third direction Z from a leading end 37a of the insertion wall portion 37 toward the bottom wall 30. The thick portion 7 of the present embodiment is connected to the bottom wall 30.

As illustrated in FIG. 12 and FIG. 15, the insertion wall portion 37 of the present embodiment has a bent portion 39 an extension direction of which is changed. As illustrated in FIG. 15, the insertion wall portion 37 has a front wall portion 37b, an inclined wall portion 37c, and a rear wall portion 37d.

The front wall portion 37b is a portion placed on a leading end side of when the insertion wall portion 37 is inserted into the inner side of the outer wall 21. The rear wall portion 37d is a portion placed on a rear end side of when the insertion wall portion 37 is inserted into the inner side of the outer wall 21. The front wall portion 37b and the rear wall portion 37d are extended in the first direction X. The rear wall portion 37d is placed on a center side in the first direction X with respect to the front wall portion 37b. The inclined wall portion 37c is a portion connecting the front wall portion 37b and the rear wall portion 37d, and is inclined in each of the first direction X and the third direction Z. The bent portion 39 is a portion in which the front wall portion 37b and the inclined wall portion 37c intersect with each other. The bent portion 39 is protruded toward a front side in an insertion direction of when the insertion wall portion 37 is inserted into the frame 2.

The thick portion 7 of the present embodiment is arranged in the front wall portion 37b and is arranged, more specifically, at an end portion in a circumferential direction of the front wall portion 37b. The thick portion 7 is arranged in a connection portion between the front wall portion 37b and the inclined wall portion 37c. That is, the thick portion 7 is arranged in the bent portion 39. The thick portion 7 is a portion in which a part of the front wall portion 37b and a part of the inclined wall portion 37c are protruded toward the inner side of the lower cover 3.

As illustrated in FIG. 15, a shape of the outer wall 21 of the frame 2 is a shape having a height difference corresponding to a shape of the side wall 31. More specifically, the second wall portion 21B has a bottom portion 21g, an inclined portion 21h, and a top portion 21i. In a case where the frame 2 and the lower cover 3 are fitted, the bottom portion 21g, the inclined portion 21h, and the top portion 21i respectively face the front wall portion 37b, the inclined wall portion 37c, and the rear wall portion 37d.

The bottom portion 21g and the top portion 21i are extended in the first direction X. The top portion 21i is placed on the center side in the first direction X with respect to the bottom portion 21g. The inclined portion 21h is a portion connecting the bottom portion 21g and the top portion 21i, and is inclined in each of the first direction X and the third direction Z. The top portion 21i is protruded in the third direction Z with respect to the bottom portion 21g. That is, in a case where the frame 2 is placed with the first end portion 211 of the outer wall 21 facing upward, the top portion 21i is placed above the bottom portion 21g. An inclination angle of the inclined portion 21h corresponds to an inclination angle of the inclined wall portion 37c. Also, a height of a protrusion of the top portion 21i with respect to the bottom portion 21g corresponds to a height of protrusion of the front wall portion 37b with respect to the rear wall portion 37d.

As illustrated in FIG. 12 and the like, the thick portion 7 has a first inclined surface 71, a second inclined surface 72, and a curved surface 73. The first inclined surface 71 is a surface facing an opposite side of the bottom wall 30, and is an end surface in the third direction Z of the thick portion 7. The first inclined surface 71 is continuous with the leading end 37a of the insertion wall portion 37 and is inclined in the third direction Z. More specifically, the first inclined surface 71 is inclined toward the opposite side of the bottom wall 30 as becoming away from the leading end 37a in the second direction Y. In other words, the first inclined surface 71 is inclined in such a manner as to guide the second wall portion 31B to the inner side of the frame 2 in a case of abutting on the outer wall 21 of the frame 2. Note that a hole 71a opened to the first inclined surface 71 is provided in the exemplified thick portion 7, but the hole 71a may not be provided.

The second inclined surface 72 is one of side surfaces of the thick portion 7, and is a surface placed on an opposite side of a side of the third wall portion 31C in the thick portion 7. The second inclined surface 72 faces the opposite side of the third wall portion 31C and faces the opposite side of the first wall portion 31A. The second inclined surface 72 faces the outer side of the lower cover 3, and is inclined in such a manner as to guide the second wall portion 31B to the inner side of the frame 2 in a case of abutting on the outer wall 21 of the frame 2.

The curved surface 73 is a surface connecting the first inclined surface 71 and the second inclined surface 72. The curved surface 73 is curved in a protruded manner, and is smoothly continuous with the first inclined surface 71 and the second inclined surface 72. The curved surface 73 is inclined in such a manner as to guide the second wall portion 31B to the inner side of the frame 2 in a case of abutting on the outer wall 21 of the frame 2.

In FIG. 15, a state before fitting of the lower cover 3 into the frame 2 in started in the fitting process is illustrated. In a case where a relative position between the frame 2 and the lower cover 3 is correct, the thick portion 7 is inserted into the inner side of the outer wall 21 in such a manner as to pass the top portion 21i and the inclined portion 21h. On the other hand, in a case where a position of the lower cover 3 is displaced within a certain area from the correct position, the thick portion 7 abuts on the outer wall 21. In FIG. 16, a state in which the curved surface 73 of the thick portion 7 abuts on the inclined portion 21h of the frame 2 is illustrated. The curved surface 73 is inclined in such a manner as to become away from the bottom wall 30 in the second direction Y toward the inner side of the lower cover 3. By the inclination of the curved surface 73, the second wall portion 31B is drawn into a space on the inner side of the outer wall 21, as indicated by an arrow Y3.

As illustrated in FIG. 16, the electric connection box 1 of the present embodiment is configured in such a manner that the second wall portion 31B in the facing wall portions 31A and 31B of the lower cover 3 abuts on the outer wall 21 first. That is, in the position in which the thick portion 7 is provided, the second wall portion 31B enters the inner side of the outer wall 21 before the first wall portion 31A does. Thus, when the position of the lower cover 3 is displaced, the position of the lower cover 3 is corrected to a correct position by the thick portion 7, and then the first wall portion 31A is inserted into the outer wall 21. Due to the wide width of the thick portion 7 in the second direction Y, the thick portion 7 abuts on the leading end of the outer wall 21 even when there is positional displacement in some extent. Thus, the thick portion 7 of the present embodiment can control generation of erroneous fitting, and can correctly guide the side wall 31 to the inner side of the outer wall 21.

In FIG. 17, a state in which the position of the lower cover 3 is greatly displaced from the correct position is illustrated. The thick portion 7 is placed outside the outer wall 21. In this case, in the electric connection box 1 of the present embodiment, the first engagement element 23 and the second engagement element 38 cannot be engaged. For example, as illustrated in FIG. 17, a trajectory Y5 of a second engagement element $38B_1$ is a trajectory passing through the outside of a corresponding first engagement element $23B_1$. That is, the first engagement element $23B_1$ and the second engagement element $38B_1$ are displaced in a thickness direction of the thick portion 7 and cannot be engaged. Thus, the electric connection box 1 of the present embodiment can make the worker realize positional displacement by making it impossible to insert the second engagement element $38B_1$ into the first engagement element $23B_1$.

Also, as illustrated in FIG. 18, engagement between the first engagement element 23C and the second engagement element 38C also becomes impossible in the third wall portions 21C and 31C. In a case where the thick portion 7 is placed outside the second wall portion 21B, a position of a leading end 38f of the second engagement element 38C is displaced with respect to an opening area 23W of the first engagement element 23C. Thus, the leading end 38f abuts on a frame of the first engagement element 23C, and the second engagement element 38C cannot be inserted into the first engagement element 23C. Since the insertion becomes impossible, the worker easily realizes generation of positional displacement.

As described above, the electric connection box 1 of the present embodiment includes a frame 2 and a lower cover 3. The frame 2 has a cylindrical outer wall 21, and has a housing space 22 on an inner side of the outer wall 21. The lower cover 3 has a side wall 31. The side wall 31 is fitted into a first end portion 211 of the outer wall 21 in an axial direction of the outer wall 21.

The first end portion 211 of the outer wall 21 has a plate-shaped protruded portion 6 protruded in the axial direction. The protruded portion 6 has a pair of side portions 60A and 60B respectively placed at one end and the other end in the width direction. The pair of side portions 60A and 60B is extended in the axial direction. The side wall 31 has a pair of edge portions 33A and 33B that are in the axial direction and respectively correspond to the pair of side portions 60A and 60B. In the side wall 31, a notch is formed between the pair of edge portions 33A and 33B. Each of the pair of side portions 60A and 60B has a first facing surface 34 and a second facing surface 35.

The first facing surface 34 abuts on the pair of side portions 60A and 60B in a thickness direction of the protruded portion 6 in a state in which the frame 2 and the lower cover 3 are not fitted. In a state in which the first facing surface 34 abuts on the pair of side portions 60A and 60B, the second facing surface 35 faces the pair of side portions 60A and 60B in a width direction of the protruded portion 6 and positions the lower cover 3 with respect to the frame 2. In such a manner, in the electric connection box 1 of the present embodiment, the frame 2 and the lower cover 3 are positioned in the thickness direction and the width direction of the protruded portion 6 by the protruded portion 6 and the pair of edge portions 33A and 33B. Thus, generation of erroneous fitting between the frame 2 and the lower cover 3 is controlled beforehand, and efficiency of work of assembling the frame 2 and the lower cover 3 is improved.

The first facing surface 34 of the present embodiment is a surface facing an inner side of the lower cover 3, and abuts on the pair of side portions 60A and 60B from the outside. A worker can easily perform position adjustment by making the pair of edge portions 33A and 33B abut on the pair of side portions 60A and 60B while visually recognizing the protruded portion 6 from the outside.

In the electric connection box 1 of the present embodiment, a passage of an electric wire W pulled out from the housing space 22 is formed by the protruded portion 6 and the lower cover 3. Since the protruded portion 6 that forms the passage of the electric wire W is also used for position adjustment, complication of the configuration is controlled.

The lower cover 3 has a holding portion 36 that holds a held portion 66 of the protruded portion 6 from the outside. The held portion 66 is provided at a leading end portion in a protrusion direction of the protruded portion 6. Since the held portion 66 is supported by the holding portion 36, a deformation of the protruded portion 6 is controlled. For example, in a case where a bending force is applied to the electric wire W pulled out from the electric connection box 1, the force acts on the protruded portion 6. In the present embodiment, since a deformation of the protruded portion 6 is controlled by the holding portion 36, interference between a member around the electric connection box 1 and the protruded portion 6 is not likely to be generated.

The protruded portion 6 of the present embodiment has a plurality of first ribs 63. Each of the first ribs 63 is a rib that is protruded in the thickness direction of the protruded portion 6 and that is extended in the width direction of the protruded portion 6. The pair of edge portions 33A and 33B abuts on a leading end surface of the first rib 63 in the thickness direction of the protruded portion 6. With this configuration, it is possible to increase rigidity of the protruded portion 6 while making the leading end surface of the first rib 63 function as a first guide surface 61.

Each of the pair of side portions 60A and 60B of the present embodiment has a second rib 64. The second rib 64 is a rib that is protruded in the thickness direction of the protruded portion 6 and that is extended in the axial direction of the outer wall 21. Each of the pair of edge portions 33A and 33B face a side surface of the second rib 64 in the width direction of the protruded portion 6. With this configuration, it is possible to increase rigidity of the protruded portion 6 while making the side surface of the second rib 64 function as a second guide surface 62.

A shape of the outer wall 21 in a case of being viewed in the axial direction of the outer wall 21 is a shape having a longitudinal direction and a lateral direction. The protruded portion 6 is arranged in the first wall portion 21A in the longitudinal direction of the outer wall 21. In this configuration, it is preferable that the protruded portion 6 is arranged in a central portion in the longitudinal direction of the first wall portion 21A that is in the longitudinal direction. With the above configuration, positional displacement between the frame 2 and the lower cover 3 is effectively controlled.

Modification Example of Embodiment

A position and a shape of a protruded portion 6 are not limited to the position and shape exemplified in the above embodiment. For example, in a protruded portion 6, a first guide surface 61 may be a surface facing an inner side of a frame 2. In this case, an edge portion 33 of a lower cover 3 is formed in such a manner as to abut on the first guide surface 61 from the inside. Thus, a first facing surface 34 of the edge portion 33 is a surface facing an outer side of the lower cover 3.

A positioning structure by a protruded portion 6 and an edge portion 33 may be applied to positioning of a frame 2 and an upper cover 4. In this case, a protruded portion 6 protruded from a second end portion 212 is provided in the frame 2, and a pair of edge portions 33A and 33B corresponding to the protruded portion 6 is provided in the upper cover 4.

Shapes and arrangements of the first engagement element 23 and the second engagement element 38 are not limited to the shapes and arrangements exemplified in the above embodiment. For example, an inserting/inserted relationship between a first engagement element 23 and a second engagement element 38 may be opposite to that of the above embodiment.

A shape and an arrangement of a thick portion 7 are not limited to the shape and the arrangement exemplified in the above embodiment. For example, a thick portion 7 may be arranged in any of wall portions 31A, 31B, 31C, and 31D of a side wall 31. The side wall 31 may have a plurality of thick portions 7. For example, one thick portion 7 may be provided in each of the first wall portion 31A and the second wall portion 31B, or two thick portions 7 may be provided in one of the first wall portion 31A and the second wall portion 31B. In a case where the side wall 31 has a plurality of thick portions 7, one thick portion 7 may be arranged at one end portion in a first direction X, and different one thick portion 7 may be arranged at the other end portion in the first direction X.

A thick portion 7 may be provided in an upper cover 4. In this case, the thick portion 7 is provided in a wall portion corresponding to a side wall 31 in the upper cover 4.

The contents disclosed in the above embodiment and modification examples can be appropriately combined and executed.

In the electric connection box according to the present embodiment, a first facing surface of the cover abuts on a pair of side portions in a thickness direction of a protruded portion in a state in which the frame and the cover are not fitted to each other. Also, in a state in which the first facing surface abuts on the pair of side portions, a second facing surface of the cover faces a pair of side portions in a width direction and positions the cover with respect to the frame. According to the electric connection box of the present embodiment, there is an effect that a cover can be easily positioned with respect to a frame and efficiency of work of assembling the frame and the cover can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric connection box comprising:
    a frame having a cylindrical outer wall and having a housing space on an inner side of the outer wall; and
    a cover having a side wall fitted into a first end portion, which is one end in an axial direction of the outer wall, in the axial direction, wherein
    the first end portion of the outer wall has a plate-shaped protruded portion that is protruded in the axial direction, the protruded portion has a pair of side portions respectively placed at one end and another end in a width direction and extended in the axial direction, the side wall has a pair of edge portions in the axial direction, the edge portions respectively corresponding to the pair of side portions, and has a notch between the pair of edge portions, each of the pair of edge portions has a first facing surface and a second facing surface, the first facing surface abuts on the pair of side portions in a thickness direction of the protruded portion in a state in which the frame and the cover are not fitted, and the second facing surface faces the pair of side portions in the width direction and positions the cover with respect to the frame in a state in which the first facing surface abuts on the pair of side portions.

2. The electric connection box according to claim 1, wherein the first facing surface is a surface facing an inner side of the cover and abuts on the pair of side portions from the outside.

3. The electric connection box according to claim 2, wherein a passage of an electric wire pulled out from the housing space is formed by the protruded portion and the cover.

4. The electric connection box according to claim 2, wherein the cover has a holding portion that holds a leading end portion in a protrusion direction of the protruded portion from an outside in the thickness direction.

5. The electric connection box according to claim 2, wherein the protruded portion has a plurality of first ribs that is ribs protruded in the thickness direction and extended the width direction, and the first facing surface abuts on leading end surfaces of the first ribs in the thickness direction.

6. The electric connection box according to claim 2, wherein a second rib that is a rib protruded in the thickness direction and extended in the axial direction is formed in each of the pair of side portions, and the second facing surface faces a side surface of the second rib in the width direction.

7. The electric connection box according to claim 2, wherein a shape of the outer wall in a case of being viewed in the axial direction is a shape having a longitudinal direction and a lateral direction, and the protruded portion is arranged in a wall portion in the longitudinal direction of the outer wall.

8. The electric connection box according to claim 1, wherein a passage of an electric wire pulled out from the housing space is formed by the protruded portion and the cover.

9. The electric connection box according to claim 8, wherein the cover has a holding portion that holds a leading end portion in a protrusion direction of the protruded portion from an outside in the thickness direction.

10. The electric connection box according to claim 3, wherein the protruded portion has a plurality of first ribs that is ribs protruded in the thickness direction and extended the width direction, and the first facing surface abuts on leading end surfaces of the first ribs in the thickness direction.

11. The electric connection box according to claim 8, wherein a second rib that is a rib protruded in the thickness direction and extended in the axial direction is formed in each of the pair of side portions, and the second facing surface faces a side surface of the second rib in the width direction.

12. The electric connection box according to claim 8, wherein a shape of the outer wall in a case of being viewed in the axial direction is a shape having a longitudinal direction and a lateral direction, and the protruded portion is arranged in a wall portion in the longitudinal direction of the outer wall.

13. The electric connection box according to claim 1, wherein the cover has a holding portion that holds a leading end portion in a protrusion direction of the protruded portion from an outside in the thickness direction.

14. The electric connection box according to claim 13, wherein the protruded portion has a plurality of first ribs that is ribs protruded in the thickness direction and extended the width direction, and the first facing surface abuts on leading end surfaces of the first ribs in the thickness direction.

15. The electric connection box according to claim 13, wherein a second rib that is a rib protruded in the thickness direction and extended in the axial direction is formed in each of the pair of side portions, and the second facing surface faces a side surface of the second rib in the width direction.

16. The electric connection box according to claim 1, wherein the protruded portion has a plurality of first ribs that is ribs protruded in the thickness direction and extended the width direction, and the first facing surface abuts on leading end surfaces of the first ribs in the thickness direction.

17. The electric connection box according to claim 16, wherein a second rib that is a rib protruded in the thickness direction and extended in the axial direction is formed in each of the pair of side portions, and the second facing surface faces a side surface of the second rib in the width direction.

18. The electric connection box according to claim 1, wherein a second rib that is a rib protruded in the thickness direction and extended in the axial direction is formed in each of the pair of side portions, and the second facing surface faces a side surface of the second rib in the width direction.

19. The electric connection box according to claim 1, wherein a shape of the outer wall in a case of being viewed in the axial direction is a shape having a longitudinal direction and a lateral direction, and the protruded portion is arranged in a wall portion in the longitudinal direction of the outer wall.

20. The electric connection box according to claim 19, wherein the protruded portion is arranged in a central portion in the longitudinal direction of the wall portion in the longitudinal direction.

* * * * *